（12） United States Patent
Nakagawa et al.

(10) Patent No.: US 8,847,883 B2
(45) Date of Patent: Sep. 30, 2014

(54) INPUT APPARATUS, INPUT METHOD, AND CONTROL SYSTEM

(75) Inventors: Toshiyuki Nakagawa, Kanagawa (JP); Masatoshi Ueno, Kanagawa (JP); Kenichi Kabasawa, Saitama (JP); Shinobu Kuriya, Kanagawa (JP); Tetsuro Goto, Tokyo (JP); Tsubasa Tsukahara, Tokyo (JP); Hideo Kawabe, Saitama (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 13/549,075

(22) Filed: Jul. 13, 2012

(65) Prior Publication Data

US 2013/0027294 A1    Jan. 31, 2013

(30) Foreign Application Priority Data

Jul. 25, 2011 (JP) ................................. 2011-161759

(51) Int. Cl.
*G09G 5/00* (2006.01)
*G06F 3/0346* (2013.01)
*G06F 3/0338* (2013.01)

(52) U.S. Cl.
CPC ............ *G06F 3/0346* (2013.01); *G06F 3/0338* (2013.01)
USPC ............ 345/156; 345/157; 345/163; 345/169

(58) Field of Classification Search
USPC .......................................... 345/156–163, 169
See application file for complete search history.

(56) References Cited

U.S. PATENT DOCUMENTS

| 7,133,026 | B2 * | 11/2006 | Horie et al. ................... 345/163 |
| 8,049,737 | B2 * | 11/2011 | Cho et al. ...................... 345/173 |
| 2007/0080945 | A1 * | 4/2007 | Huppi ............................ 345/163 |
| 2011/0069024 | A1 * | 3/2011 | Kim .............................. 345/173 |
| 2012/0011932 | A1 * | 1/2012 | Nakagawa et al. ........ 73/379.02 |

FOREIGN PATENT DOCUMENTS

JP            64-028720 A         1/1989

* cited by examiner

*Primary Examiner* — Jennifer Nguyen
(74) *Attorney, Agent, or Firm* — Wolf, Greenfield & Sacks, P.C.

(57) ABSTRACT

There is provided an apparatus including an input apparatus including an input apparatus main body with which input manipulation is performed to manipulate a manipulation target object, a first manipulation detection unit that detects a first manipulation on the input apparatus main body, a second manipulation detection unit that detects a second manipulation on the input apparatus main body after the first manipulation is detected, and a first processing unit that performs first processing for manipulation on the manipulation target object or a first response of the input apparatus, based on a movement detection value corresponding to movement of the input apparatus main body according to the first manipulation or a detection value of the first manipulation.

19 Claims, 20 Drawing Sheets

FIG.5
(A)
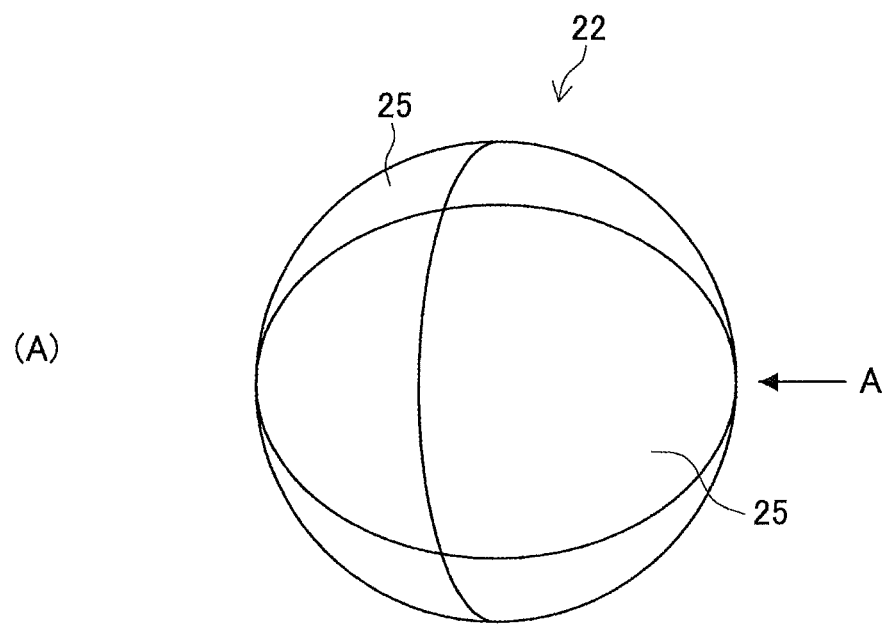
(B)
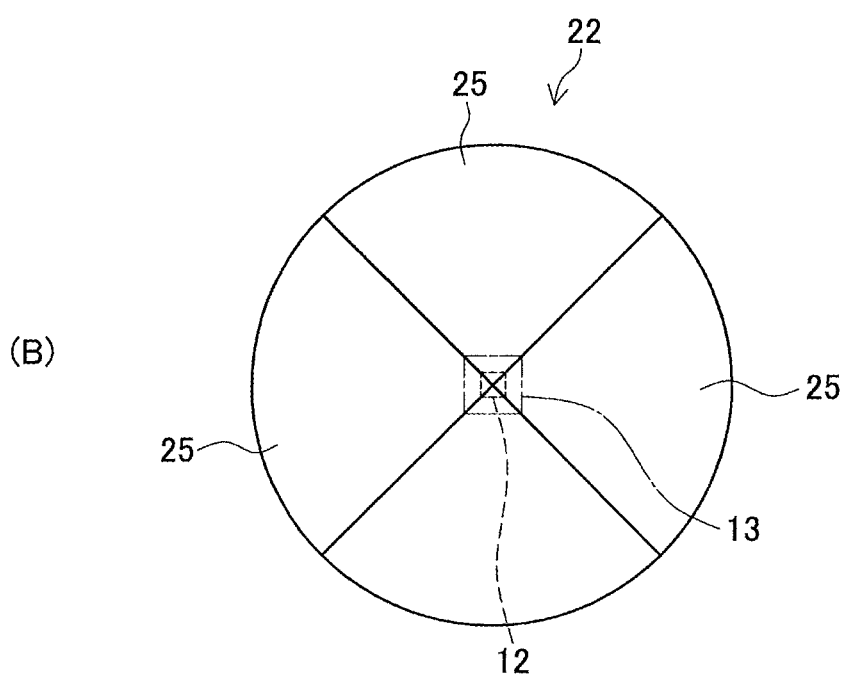

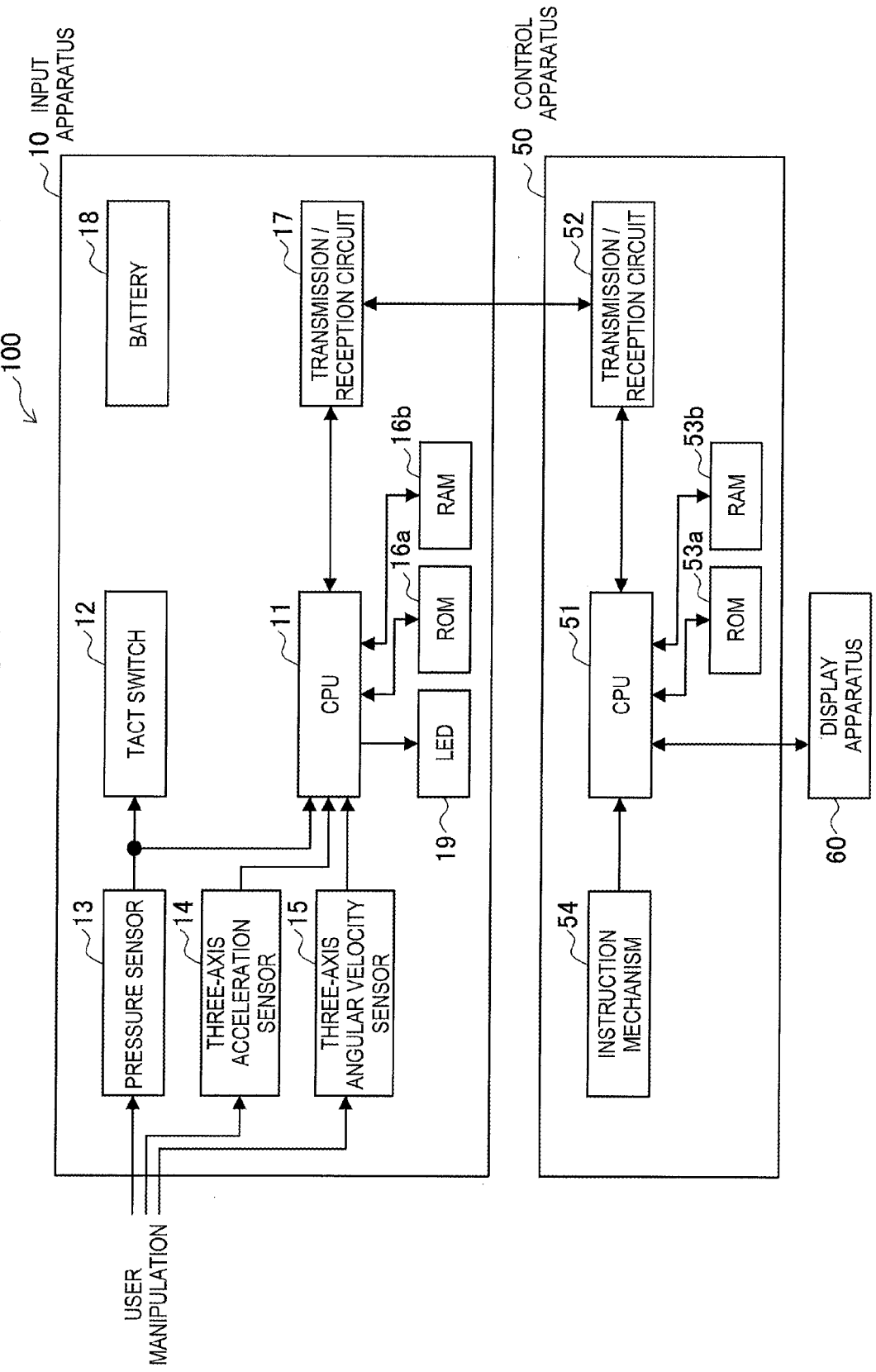

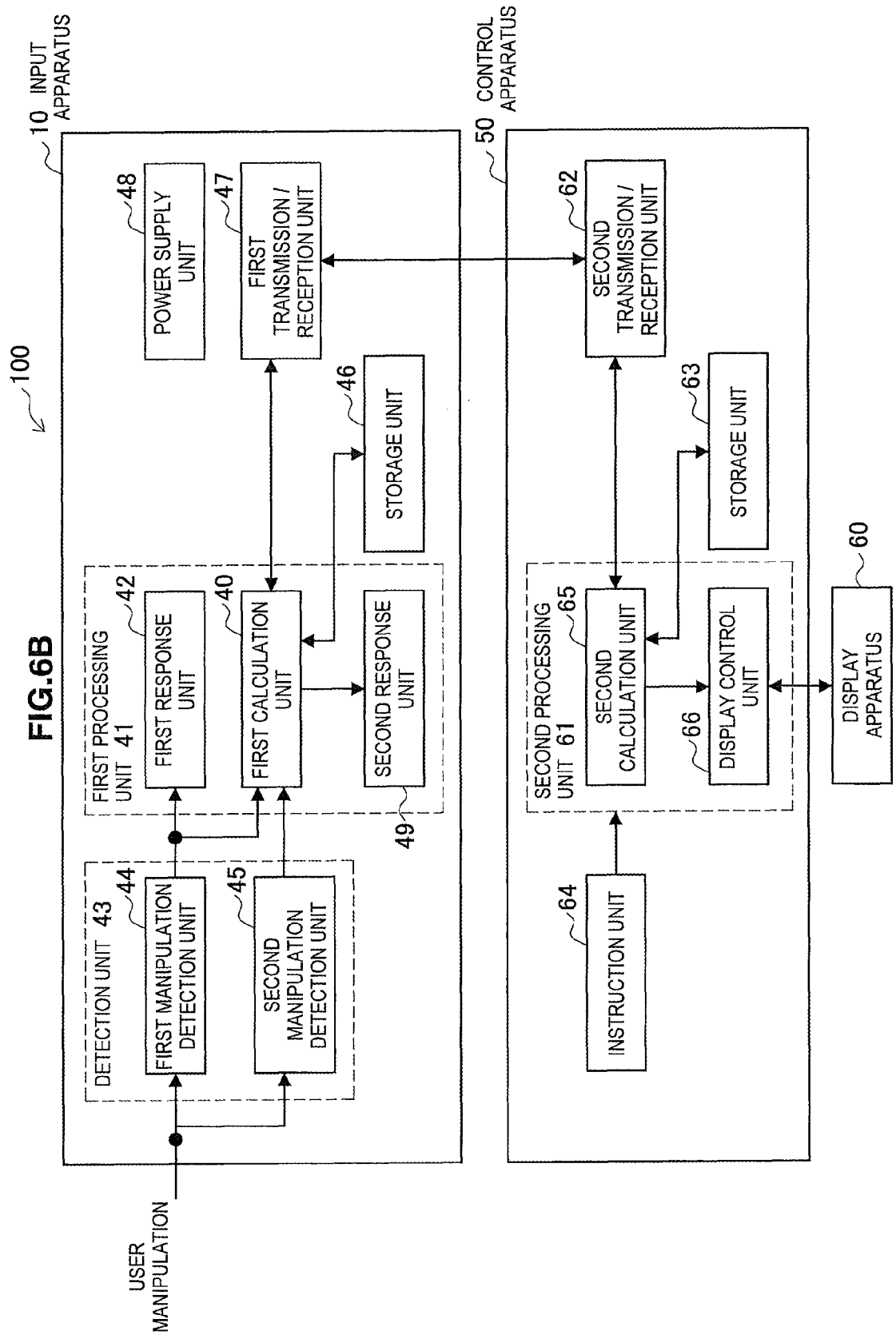

FIG.7
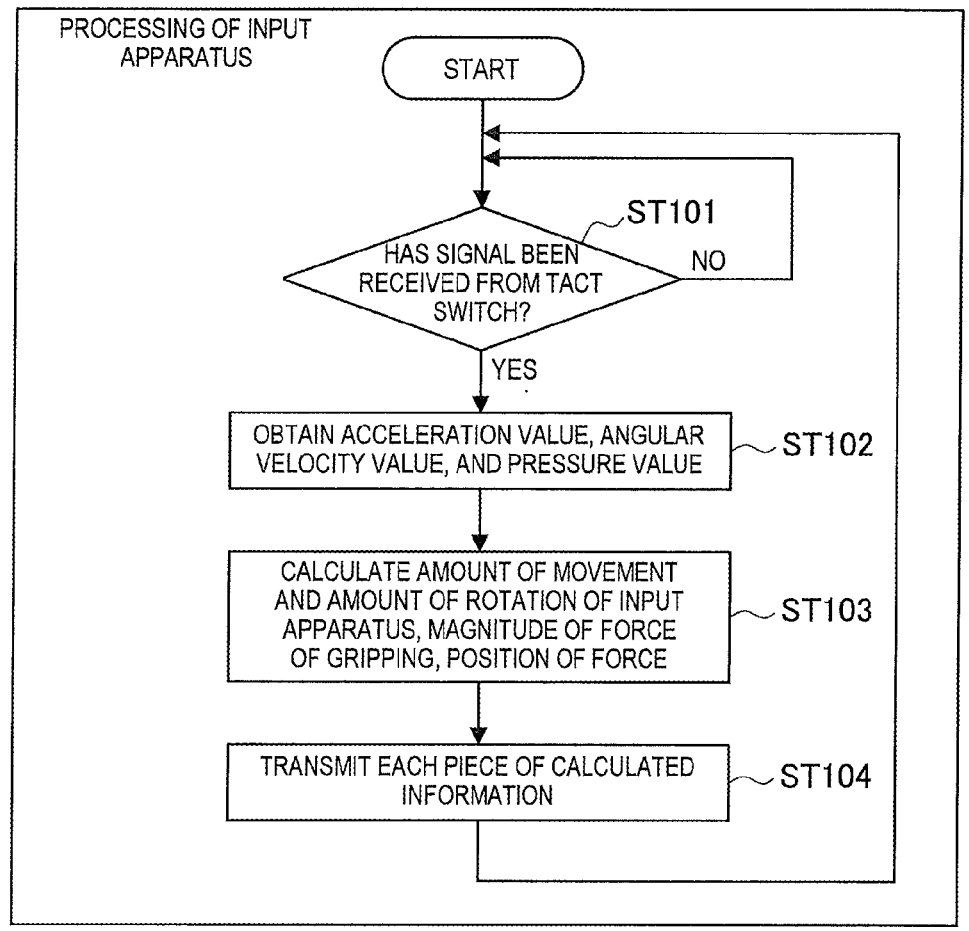
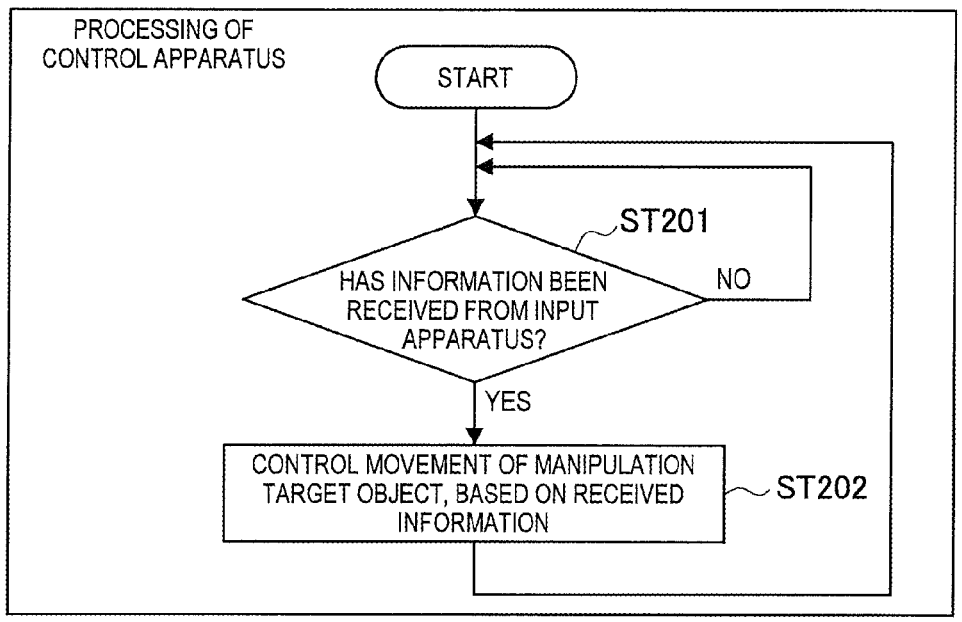

FIG.18

|  | MANIPULATION OF INPUT APPARATUS | DISPLAY SCREEN |
|---|---|---|
| EXAMPLE OF FIRST MANIPULATION | MANIPULATION FOR CURSOR MOVEMENT<br><br>EXAMPLE 1: RAISE INPUT APPARATUS FROM TABLE<br>EXAMPLE 2: TAP<br>EXAMPLE 3: GRIP TWICE<br>EXAMPLE 4: GRIP FOR TWO SECONDS | MOVEMENT OF CURSOR |
| EXAMPLE OF SECOND MANIPULATION | GRIP AND MANIPULATE INPUT APPARATUS<br><br>FOR EXAMPLE, GRIP AND SHAKE INPUT APPARATUS | ACTIVATE APPLICATION |

FIG.19

< CASE OF SINGLE APPLICATION >

|  | MANIPULATION OF INPUT APPARATUS | (SINGLE) APPLICATION |
| --- | --- | --- |
| EXAMPLE OF FIRST MANIPULATION | MANIPULATION FOR ACTIVATION OF APPLICATION<br><br>EXAMPLE 1: RAISE INPUT APPARATUS FROM TABLE<br>EXAMPLE 2: GRIP THREE TIMES | APPLICATION IS ACTIVATED, AND STANDBY STATE IS ATTAINED<br><br>FOR EXAMPLE, APPLICATION OF MAP INFORMATION IS ACTIVATED, AND MAP IS DISPLAYED |
| EXAMPLE OF SECOND MANIPULATION | GRIP AND MANIPULATE INPUT APPARATUS<br><br>FOR EXAMPLE, GRIP AND SHAKE INPUT APPARATUS | MANIPULATE MAP INFORMATION (SAME APPLICATION) |

< CASE OF MULTIPLE APPLICATIONS >

|  | MANIPULATION OF INPUT APPARATUS | (MULTIPLE) APPLICATIONS |
| --- | --- | --- |
| EXAMPLE OF FIRST MANIPULATION | GRIP AND MANIPULATE INPUT APPARATUS<br><br>FOR EXAMPLE, GRIP AND SHAKE INPUT APPARATUS | MANIPULATE MAP INFORMATION |
| EXAMPLE OF SECOND MANIPULATION | MANIPULATION FOR ACTIVATION OF APPLICATION<br><br>EXAMPLE 1: RAISE INPUT APPARATUS FROM TABLE<br>EXAMPLE 2: GRIP THREE TIMES | FOR EXAMPLE, APPLICATION OF GUIDE INFORMATION IS ACTIVATED, AND GUIDE INFORMATION IS DISPLAYED (DIFFERENT APPLICATION) |

INPUT APPARATUS, INPUT METHOD, AND CONTROL SYSTEM

BACKGROUND

The present disclosure relates to, for example, an input apparatus, an input method, and a control system to which input is given to manipulate a manipulation target object displayed in a two-dimensional and three-dimensional manner.

For example, a mouse is widely used as an input apparatus for manipulating a GUI (Graphical User Interface) displayed in a two-dimensional manner on a display. In recent years, this is not limited to a planar manipulation-type input apparatus such as a mouse, and various kinds of space manipulation-type input apparatuses have been suggested (for example, see Japanese Patent Application Laid-Open No. 64-28720 (page 2, FIGS. 1 to 3)).

Japanese Patent Application Laid-Open No. 64-28720 describes a three-dimensional input apparatus having a spherical shape. This three-dimensional input apparatus includes a spherical shell filled with a liquid or a solid material therein and multiple pressure sensors arranged on the inner surface of the spherical shell.

When a user grips the three-dimensional input apparatus and moves the three-dimensional input apparatus in space, there occurs changes of pressures on the inner surface of the spherical shell in proportional to acceleration, and the pressure sensors measure these changes of pressures.

The calculation processing unit executes operation based on sensor outputs from the pressure sensors, thus calculating the amount of movement and rotation of the three-dimensional input apparatus in the space.

SUMMARY

For example, when a user manipulates a manipulation target object using a space manipulation-type input apparatus as described in Japanese Patent Application Laid-Open No. 64-28720, the manipulation target object may move against what the user expects, unlike a planar manipulation-type input apparatus such as a mouse.

For example, when the user grips the input apparatus placed on a table and raises the input apparatus in order to start manipulating the manipulation target object, the manipulation target object may move in synchronization with this manipulation although the user does not want such movement.

Therefore, an input apparatus, an input method, and a control system, which the user can comfortably manipulate a manipulation target object as desired by the user, have been sought.

According to the present disclosure, an input apparatus is provided that includes an input apparatus main body with which input manipulation is performed to manipulate a manipulation target object, a first manipulation detection unit that detects a first manipulation on the input apparatus main body, a second manipulation detection unit that detects a second manipulation on the input apparatus main body after the first manipulation is detected, and a first processing unit that performs first processing for manipulation on the manipulation target object or a first response of the input apparatus, based on a movement detection value corresponding to movement of the input apparatus main body according to the first manipulation or a detection value of the first manipulation, wherein after the first manipulation is detected, second processing for manipulation on the manipulation target object or the first response of the input apparatus is performed based on a movement detection value corresponding to movement of the input apparatus main body according to the second manipulation or a detection value of the second manipulation.

According to the present disclosure, an input method is provided that includes detecting a first manipulation on an input apparatus main body with which input manipulation is performed to manipulate a manipulation target object, detecting a second manipulation on the input apparatus main body after the first manipulation is detected, performing first processing for manipulation on the manipulation target object or a first response of the input apparatus, based on a movement detection value corresponding to movement of the input apparatus main body according to the first manipulation or a detection value of the first manipulation, and performing, after the first manipulation is detected, second processing for manipulation on the manipulation target object or the first response of the input apparatus, based on a movement detection value corresponding to movement of the input apparatus main body according to the second manipulation or a detection value of the second manipulation.

According to the present disclosure, a control system is provided that includes an input apparatus which includes an input apparatus main body with which input manipulation is performed to manipulate a manipulation target object, a first manipulation detection unit that detects a first manipulation on the input apparatus main body, a second manipulation detection unit that detects a second manipulation on the input apparatus main body after the first manipulation is detected, and a first processing unit that performs first processing for manipulation on the manipulation target object or a first response of the input apparatus, based on a movement detection value corresponding to movement of the input apparatus main body according to the first manipulation or a detection value of the first manipulation, and a control apparatus which controls the manipulation target object according to manipulation of the input apparatus, wherein, after the first manipulation is detected, the input apparatus performs second processing for manipulation on the manipulation target object or the first response of the input apparatus, based on a movement detection value corresponding to movement of the input apparatus main body according to the second manipulation or a detection value of the second manipulation, and wherein the control apparatus controls the manipulation target object, according to the first processing or the second processing performed by the input apparatus.

As described above, according to the present disclosure, the input apparatus, the input method, and the control system, which the user can comfortably manipulate the manipulation target object as desired by the user, can be provided.

BRIEF DESCRIPTION OF THE DRAWINGS

FIGS. 5A and 5B are external views illustrating a shell-shaped portion of the input apparatus according to each embodiment;

FIG. 6A is a functional configuration diagram illustrating a control system according to a first embodiment;

FIG. 6B is a block diagram illustrating an electrical configuration of the control system according to the first embodiment;

FIG. 7 is a flowchart illustrating operation of the control system according to the first embodiment of the present disclosure;

FIG. 18 is a figure illustrating an example of a first manipulation and a second manipulation; and FIG. 19 is a figure illustrating an example of the first manipulation and the second manipulation.

DETAILED DESCRIPTION OF THE EMBODIMENTS

Figure 1:
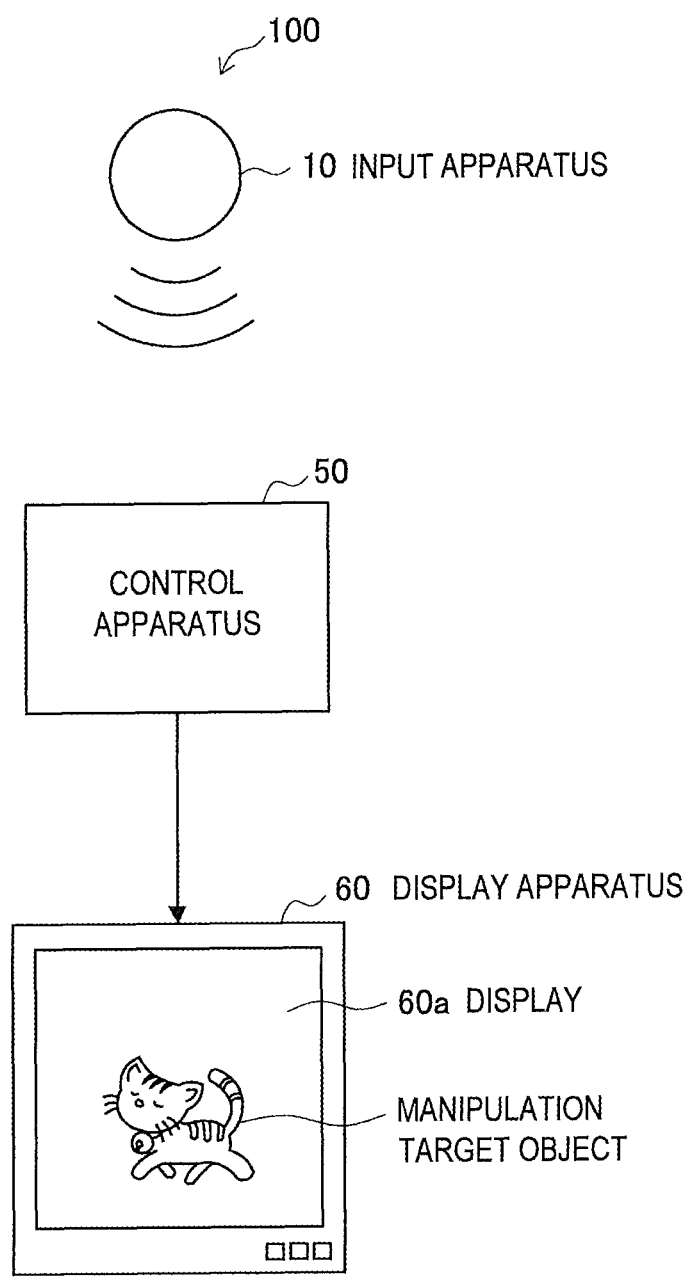
FIG. 1 is a figure illustrating a control system including an input apparatus according to each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. First embodiment
   1.1. Overall configuration of system
   1.2. Configuration of input apparatus
   1.3. Configuration of control apparatus
   1.4. Operation of input apparatus
2. Second embodiment
   2.1. Configuration of input apparatus
   2.2. Operation of input apparatus
   2.3. Modification
3. Third embodiment
   3.1. Configuration of input apparatus
   3.2. Operation of input apparatus
   3.3. Modification
4. Fourth embodiment
5. Fifth embodiment
6. Sixth embodiment
   6.1. Correction for making curved movement of input apparatus into straight movement
   6.2. Correction for making velocity constant
   6.3. Correction for making angular velocity constant
7. Seventh embodiment
   7.1. Operation of input apparatus
8. Eighth embodiment
   8.1. Operation of input apparatus
   8.2. Example of first manipulation, second manipulation
9. Various kinds of modifications First Embodiment Overall Configuration of System First, a control system according to an embodiment of the present disclosure will be explained with reference to FIG. 1. FIG. 1 is a figure illustrating a control system 100 including an input apparatus 10 according to the first embodiment and each embodiment, explained later, of the present disclosure. The control system 100 includes an input apparatus 10, a control apparatus 50, and a display apparatus 60.

The input apparatus 10 is, for example, a spherical device which a user inputs and manipulates in order to manipulate a manipulation target object displayed on a display 60a of the display apparatus 60. The control apparatus 50 controls display of the manipulation target object according to manipulation of the input apparatus 10.

The control apparatus 50 may be a device dedicated for the input apparatus 10, or may be a PC and the like. Accordingly, in the control system 100, the user can remotely manipulate the manipulation target object displayed on the display 60a by manipulating the input apparatus 10.

"Configuration of Input Apparatus"

Figure 2:
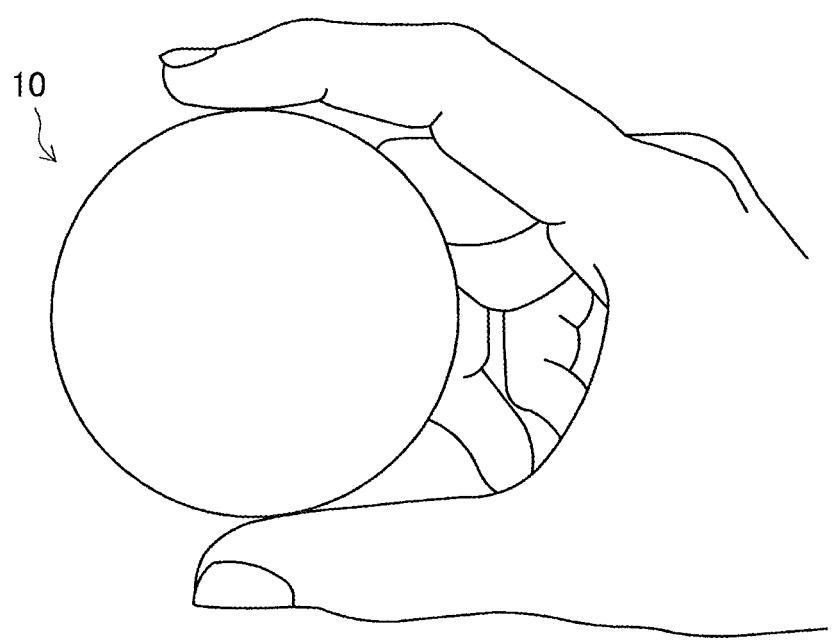
FIG. 2 is a figure illustrating a state where a user grips the input apparatus according to each embodiment.

FIG. 2 is a figure illustrating a state where the user grips the input apparatus 10. As illustrated in FIG. 2, the input apparatus 10 has a spherical shape. The size of the input apparatus 10 is approximately slightly larger than the size of a hardball of baseball or slightly smaller than the size of a hardball of baseball. The diameter of the input apparatus 10 is, for example, about 50 mm to 100 mm. Therefore, the size of the input apparatus 10 is about the size that can be easily handled when the user grips the input apparatus 10. However, the size of the diameter of the input apparatus 10 is not limited to the above ranges. It is to be understood that the size of the diameter of the input apparatus 10 may be other values.

Figure 3:
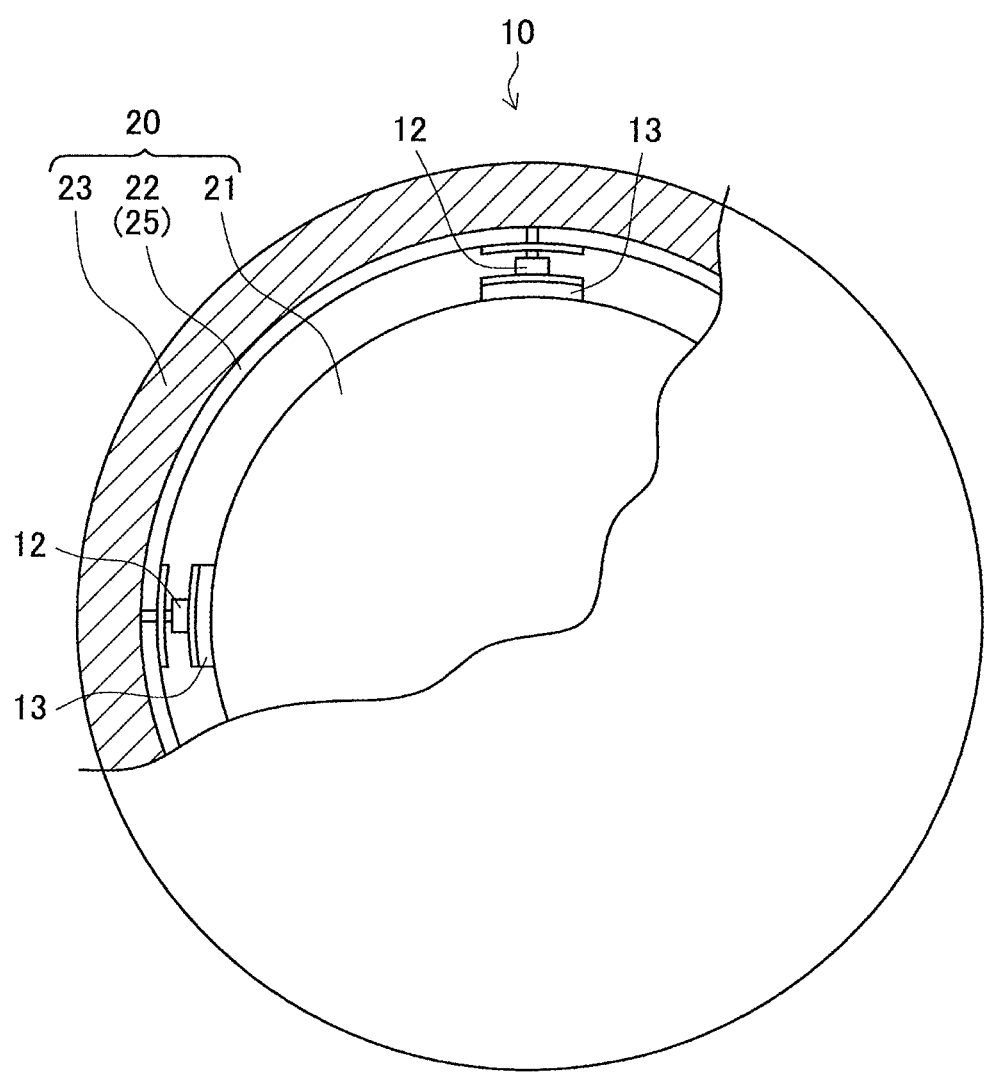
FIG. 3 is a partial cutaway view illustrating the input apparatus according to each embodiment.
Figure 4:
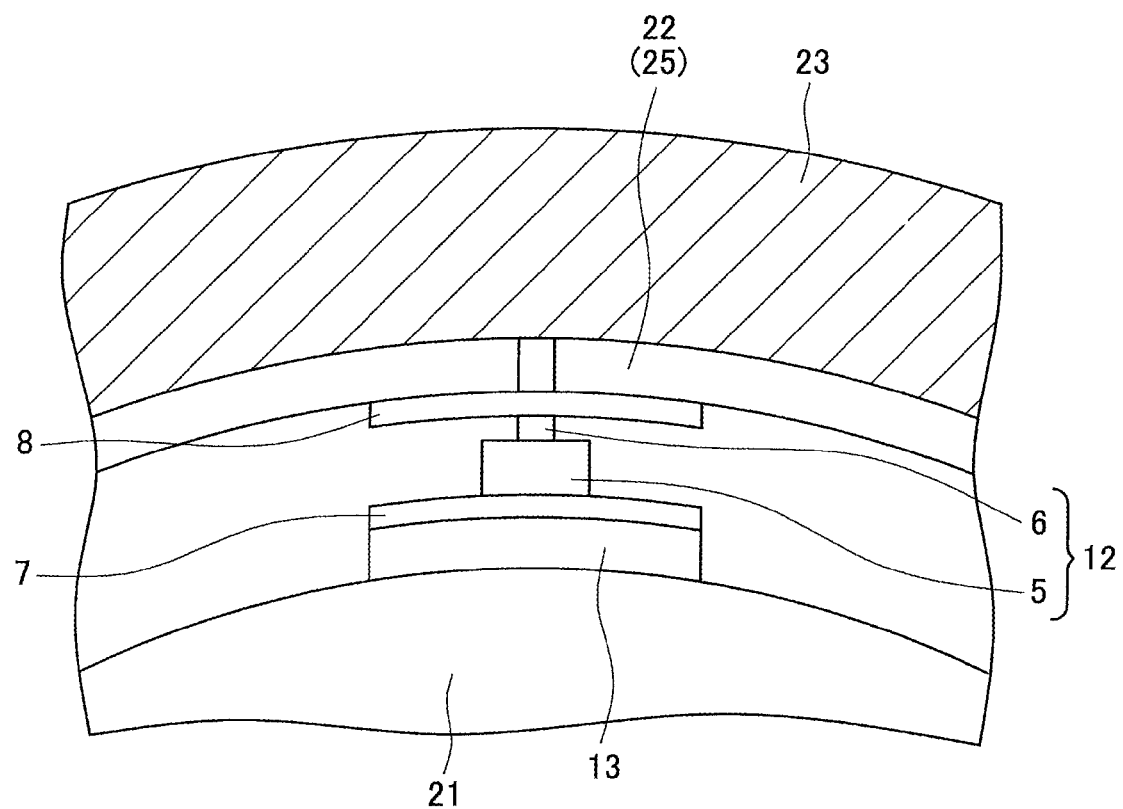
FIG. 4 is a partially enlarged view illustrating the cutaway view as shown in FIG. 3.

FIG. 3 is a partial cutaway view of the input apparatus 10. FIG. 4 is a partially enlarged view illustrating the cutaway view as shown in FIG. 3. On the other hand, FIGS. 5A and 5B are external views illustrating a shell-shaped portion 22 of the input apparatus 10. FIG. 5A illustrates a state where the shell-shaped portion 22 is seen from an obliquely upward direction. FIG. 5B illustrates a state where the shell-shaped portion 22 is seen from A direction as shown in FIG. 5A.

As illustrated in FIGS. 3 to 5A and 5B, the input apparatus 10 includes an input apparatus main body 20 including a spherical-shaped base portion 21 provided in a central portion of the input apparatus 10, a spherical shell-shaped portion 22 provided to cover the entire surface of the base portion 21, and a gripping portion 23 provided to cover the entire surface of the shell-shaped portion 22.

The input apparatus 10 has a tact switch 12 (switch portion) that detects that the input apparatus 10 is gripped with a force equal to or more than a predetermined force, and makes "click feeling" (first response). The input apparatus 10 has a pressure sensor 13 (detecting gripping force) that detects the magnitude of the force with which the user grips the input apparatus 10.

The inside of the base portion 21 is hollow. A circuit board mounted with electronic components such as a CPU 11 (see the upper figure of FIG. 6B) is provided in the hollow portion in the base portion 21.

As illustrated in FIG. 5, the shell-shaped portion 22 is configured to have eight plates 25 having the same shape. The shape of each of the plates 25 is a shape close to an equilateral triangle. The vertexes of corner portions of four adjacent plates 25 of the eight plates 25 are concentrated on one point, and totally six points on which the vertexes are concentrated are formed. At the positions corresponding to these six points, the tact switch 12 and the pressure sensor 13 are provided respectively. In other words, the input apparatus 10 according to the present embodiment include six tact switches 12 and six pressure sensors 13.

As shown in FIGS. 3 and 4, the tact switch 12 and the pressure sensor 13 are provided between the surface of the base portion 21 and the inner surface of the shell-shaped portion 22 (plate 25).

The pressure sensor 13 is provided on the surface of the base portion 21, and the tact switch 12 is provided on the pressure sensor 13. A first pressure diffusion plate 7 is interposed between the pressure sensor 13 and the tact switch 12, and a second pressure diffusion plate 8 is interposed between the tact switch 12 and the inner surface of the shell-shaped portion 22 (plate 25). With the first pressure diffusion plate 7 and the second pressure diffusion plate 8, the force with which the user grips the gripping portion 23 can be uniformly transmitted to the pressure sensor 13. The pressure sensor 13 senses the magnitude of the force with which the input apparatus main body is gripped.

The tact switch 12 includes a switch main body 5 and a movable portion 6 that can move with respect to the switch main body 5. The tact switch 12 includes an electrical switch mechanism (detection unit) (not shown) therein, capable of switching ON/OFF according to movement of the movable portion 6. The tact switch 12 includes a click feeling generating mechanism (first response unit) (not shown) using an elastic body such as a plate spring generating click feeling according to movement of the movable portion 6.

Now, relationship between the pressure sensor 13 and the magnitude of the force applied to the plate 25 will be explained. When the magnitude of the force applied to a plate 25 and the position of the applied force are calculated based on the pressure values detected by the pressure sensors 13, at least three pressure sensors 13 are used for one plate 25.

In the present embodiment, the three pressure sensors 13 detecting the pressure applied to the plate 25 (which are shared with other plates 25) are provided for one plate 25. Therefore, operation is executed using vector calculation and the like based on the pressure values given by the pressure sensors 13, so that the magnitude of the force applied to the plate 25 and the position to which the force is applied can be calculated accurately.

When three pressure sensors 13 are used for each of the eight plates 25, it is originally considered to use totally 24 pressure sensors 13, which is obtained from multiplication of 8 by 3. In the present embodiment, however, the pressure sensor 13 is provided at the position on which the vertexes of corner portions of four adjacent plates 25 are concentrated, and one pressure sensor 13 is shared by the four adjacent plates 25. Therefore, the pressure sensors are sufficient if there are totally six pressure sensors, and the cost of the input apparatus 10 can be reduced.

As described above, in the present embodiment, with the minimum number of pressure sensors 13, the magnitude of the force applied to the plate 25 and the position to which the force is applied can be calculated accurately.

However, the pressure sensors 13 may not be necessarily configured as described above. For example, one or two pressure sensors may be provided for one plate 25, or four or more pressure sensors may be provided therefor. The pressure sensors 13 may not be configured to be shared with other plates 25, and may be provided independently for the respective plates 25.

In a typical case, the pressure sensors 13 may be in any form, as long as the pressure sensors 13 can detect the force applied to the plate 25 (shell-shaped portion 22) when the user grips the input apparatus 10. Moreover, the number of plates 25 (the number into which the shell-shaped portion 22 is divided) is not limited to eight. For example, the number of plates 25 may be 2, 4, or the like.

The base portion 21 and the shell-shaped portion 22 are made with, for example, materials such as metal and resin. On the other hand, the gripping portion 23 is made with materials softer than the base portion 21 and the shell-shaped portion 22. Examples of materials used as the gripping portion 23 include sponges formed by making foaming in synthetic resin such as polyurethane.

When the material such as sponge is used as the material used in the gripping portion 23, the sense of touch can be improved, and the user can finely adjust the magnitude of the force of gripping of the input apparatus 10.

Subsequently, the electrical configuration of the input apparatus 10 will be explained with reference to FIGS. 6A and 6B. The upper figure of FIG. 6A is a block diagram illustrating an electrical configuration of the input apparatus 10. The upper figure of FIG. 6B is a functional configuration diagram of the input apparatus 10.

First, the electrical configuration of the input apparatus 10 will be explained. As illustrated in the upper figure of FIG. 6A, the input apparatus 10 includes not only the tact switches 12, and the pressure sensors 13 but also the CPU (Central Processing Unit) 11, a three-axis acceleration sensor 14, a three-axis angular velocity sensor 15, a ROM 16a, a RAM 16b, transmission/reception circuit 17, and a battery 18. The input apparatus 10 may have an LED 19 (Light Emitting Diode).

The three-axis acceleration sensor 14, the three-axis angular velocity sensor 15, the CPU 11, the transmission/reception circuit 17, the ROM (Read Only Memory) 16a, the RAM (Random Access Memory) 16b, and the LED 19 are mounted on a circuit board, not shown. This circuit board mounted with electronic components such as the CPU 11 and the battery 18 are provided in a hollow portion formed in the base portion 21.

The three-axis acceleration sensor 14 and the three-axis angular velocity sensor 15 (example of the detection unit) are sensors detecting movement of the input apparatus 10 in the space. The three-axis acceleration sensor 14 detects accelerations in three-axis directions which are perpendicular to each other, and outputs an acceleration values (example of movement detection values) according to the detected accelerations to the CPU 11. The three-axis angular velocity sensor 15 detects angular velocities around three axes perpendicular to each other, and outputs angular velocity values (example of movement detection values) according to the detected angular velocities to the CPU 11.

The ROM 16a is a nonvolatile memory, and stores various kinds of programs for the processing of the CPU 11. The RAM 16b is a volatile memory, and is used as a work area of the CPU 11.

The tact switch 12 outputs a signal to the CPU 11 when the switch mechanism is in ON state. The pressure sensor 13 is an example of pressure sensor that outputs a pressure value according to the magnitude of the force with which the user grips the input apparatus 10 to the CPU 11.

The CPU 11 executes various kinds of operations based on the angular velocity values, the acceleration values, and the pressure values which are output from the three-axis acceleration sensor 14, the three-axis angular velocity sensor 15, and the pressure sensor 13, in order to control the manipulation target object. For example, the CPU 11 calculates the amount of movement, the amount of rotation, and the like of the input apparatus 10 in space, based on the acceleration values and the angular velocity values. The CPU 11 also calculates the magnitude of the force with which the input apparatus 10 is gripped, the position to which the force is applied, and the like, based on the pressure values which are output from the pressure sensors 13. It should be noted that the CPU 11 executes various kinds of operations explained above, while the CPU 11 receives signals from the switch mechanisms of the tact switches 12. The CPU 11 executes functions of a first calculation unit explained later.

The transmission/reception circuit 17 includes an antenna and the like, and transmits various kinds of information to the control apparatus 50 based on the control of the CPU 11. For example, the transmission/reception circuit 17 transmits information about the amount of movement and the amount of rotation of the input apparatus 10 in space, the magnitude of the force of gripping, and information about the position to which the force is applied, and the like to the control apparatus 50. It should be noted that the transmission/reception circuit 17 can also receive information transmitted from the control apparatus 50.

For example, a rechargeable battery is used as the battery 18.

Subsequently, the functional configuration of the input apparatus 10 will be explained using the upper figure of FIG. 6B. The input apparatus 10 includes a detection unit 43, a first processing unit 41, a storage unit 46, a first transmission/reception unit 47, and a power supply unit 48. The detection unit 43 includes a first manipulation detection unit 44 and a second manipulation detection unit 45. The first processing unit 41 includes a first response unit 42, a first calculation unit 40, and a second response unit 49.

The detection unit 43 detects that the input apparatus main body is gripped by the user with a force equal to or more than a predetermined force. For example, the detection unit 43 detects the magnitude of the force with which the input apparatus main body is gripped, and outputs a gripping force detection value according to the magnitude of the force of gripping. The first manipulation detection unit 44 detects a first manipulation of the input apparatus main body. As illustrated in FIG. 18, examples of first manipulation include gripping the input apparatus 10, raising the input apparatus 10 from a table, tapping the input apparatus 10, and the like. The first manipulation is not limited to gripping the input apparatus 10. The first manipulation detection unit 44 may detect that, for example, the input apparatus main body is gripped with a pressure equal to or more than a predetermined pressure (for example, first threshold value). The first manipulation detection unit 44 may output the gripping force detection value according to the magnitude of the force of gripping based on the detection result.

After the first manipulation is detected, the second manipulation detection unit 45 detects a second manipulation of the input apparatus main body. The second manipulation is detected after the first manipulation was detected. The first detection and the second detection are not performed at the same time.

As illustrated in FIG. 18, examples of second manipulation include manipulating by gripping the input apparatus 10 (gripping and shaking the input apparatus 10). The second manipulation is not limited to gripping the input apparatus 10. The detection values detected by the first manipulation detection unit 44 and the second manipulation detection unit 45 are at least one of values sensed by the pressure sensor 13, the three-axis acceleration sensor 14, and the three-axis angular velocity sensor 15 (gyro sensor). The second manipulation detection unit 45 detects that, for example, the input apparatus main body is gripped with a pressure equal to or more than a predetermined pressure (second threshold value). The second threshold value is defined in advance as a value larger than the first threshold value.

The first response unit 42 makes the first response of the input apparatus 10 based on detection of the first manipulation. Examples of first response include making a click sound and giving a repulsive force to a hand of a user holding the input apparatus 10 using a spring provided in the input apparatus 10. However, it is not necessary to give the first response at all times to the user based on the detection of the first manipulation. For example, the first response unit 42 may give the first response to the user when the detection unit detects that the input apparatus is gripped and when the detection unit detects that the input apparatus is no longer gripped. The first response unit 42 may give the first response to the user without relying on the control of the first processing unit when at least the detection unit detects that the input apparatus main body is gripped. The first response is basically processing without relying on the CPU, and therefore, the first response has immediate responsiveness. However, the first response may be made by way of the CPU.

The first calculation unit 40 may perform calculation for manipulation of the manipulation target object (first processing) based on the movement detection value corresponding to the movement of the input apparatus main body according to the first manipulation, and may perform calculation for manipulation of the manipulation target object (second processing) based on the movement detection value corresponding to the movement of the input apparatus main body according to the second manipulation.

It should be noted that first manipulation detection unit 44 can prompt the first response unit 42 to perform the response processing without relying on the first calculation unit 40. Therefore, the response of the click sound can be given to the user even though the first response unit 42 does not send the first response to the first calculation unit 40. Therefore, the first response of the click sound given by the first response unit 42 can be executed at a faster speed than processing based on a calculation result provided by the first calculation unit 40. However, the embodiment is not limited thereto. The first response (for example, the response of the click sound) may be sent to the first calculation unit 40, and may be used as a trigger for starting calculation of the first calculation unit 40.

It should be noted that the first processing and the second processing are different types of manipulation of the manipulation target object, and do not include the same type of manipulation. An example of different types of manipulation includes generating a click sound when the force with which the input apparatus 10 is gripped becomes equal to or more than a predetermined first threshold pressure in the first processing and executing calculation for manipulation of the manipulation target object based on the movement detection values with various kinds of sensors when the input apparatus 10 is gripped more strongly so that the force with which the input apparatus 10 is gripped becomes equal to or more than a predetermined second threshold pressure in the second processing. Another example of different types of manipulation includes enabling manipulation (allowing input of manipulation) when the input apparatus 10 is gripped two seconds in the first processing, changing to a cursor movement manipulation mode, and selecting the manipulation target object and entering into a manipulation mode when the input apparatus 10 is gripped four seconds again in the second processing. An example of same type of manipulation includes detecting a detection value at three levels using a pressure sensor, and changing to the first processing when the input apparatus 10 is gripped weakly and changing to the second processing when the input apparatus 10 is gripped strongly. This kind of same type of manipulation is not included in the first processing and the second processing of each embodiment.

It should be noted that the first response to the user given by the input apparatus with the first response unit 42 is not transmitted or received to/from the control apparatus 50 controlling the manipulation target object, but the calculation result for manipulation of the manipulation target object with the first calculation unit 40 is transmitted and received to/from the control apparatus 50. Therefore, since the first response processing with the first response unit 42 is made via a route that does not include transmission/reception processing, there is an advantage in that the first response processing is faster than the processing based on the calculation result provided by the first calculation unit 40 including the transmission/reception processing.

The second response unit 49 makes the second response of the input apparatus based on detection of the second manipulation. Examples of second response includes blinking an LED attached to the input apparatus 10 and giving feedback to the user using audio output, force display, and the like. The second response is basically processing without relying on the CPU, and therefore, the second response has immediate responsiveness. However, the second response may be made by way of the CPU.

As explained above, the first processing unit 41 performs the first processing for the first response of the input apparatus 10 or manipulation of the manipulation target object, based on the detection value of the first manipulation or the movement detection value corresponding to the movement of the input apparatus main body according to the first manipulation, and after the first manipulation is detected, the first processing unit 41 performs the second processing for the first response of the input apparatus 10 or manipulation of the manipulation target object, based on the detection value of the second manipulation or the movement detection value corresponding to the movement of the input apparatus main body according to the second manipulation. The first processing unit 41 may detect movement of the input apparatus main body, and output the movement detection value according to the movement of the input apparatus main body, and while it is detected that the input apparatus main body is gripped, the first processing unit 41 may execute processing for controlling the manipulation target object based on the movement detection value. The first processing unit may further include the second response unit giving the second response, which is different from the first response, to the user under the control of the first processing unit. The first processing unit 41 may control the second response made by the second response unit, based on the movement detection value or the gripping force detection value. While it is detected that the input apparatus main body is gripped, the first processing unit 41 may execute processing for controlling the manipulation target object, based on the detection value of the movement and the gripping force detection value.

In the first processing unit 41 and the second processing unit 61 in the control apparatus, both or one of the first processing unit 41 and the second processing unit 61 performs desired processing using each detection result as necessary, and outputs the result to a display control unit 66 via the second processing unit 61.

The storage unit 46 may be achieved as a RAM 16b or a ROM 16a using, for example, a semiconductor memory, a magnetic disk, or an optical disk.

The first transmission/reception unit 47 transmits and receives predetermined information between the input apparatus 10 and the control apparatus 50. The first transmission/reception unit 47 and the second transmission/reception unit 62 are connected via a wire or connected wirelessly.

In the power supply unit 48, for example, a rechargeable battery is used as the battery 18, which provides electric power to each unit.

It should be noted that the functions of the first calculation unit 40 can be achieved when, for example, the CPU 11 operates according to programs stored in the storage unit 46. This program may be stored and provided in a memory medium, and may be read to the storage unit 46 via a driver, not shown. Alternatively, it may be downloaded from a network and stored to the storage unit 46. In order to achieve the function of each of the above units, a DSP (Digital Signal Processor) may be used instead of the CPU. Alternatively, the function of each of the above units may be achieved with operation using software, and may be achieved with operation using hardware.

"Configuration of Control Apparatus"

Subsequently, the electrical configuration of the control apparatus 50 will be explained with reference to the lower figure of FIG. 6A. The control apparatus 50 includes a CPU 51, a ROM 53a, a RAM 53b, a transmission/reception circuit 52, and a instruction mechanism 54.

The ROM 53a is a nonvolatile memory, and stores various kinds of programs for the processing of the CPU 51. The RAM 53b is a volatile memory, and is used as a work area of the CPU 51.

The transmission/reception circuit 52 includes an antenna and the like, and receives various kinds of information transmitted from the input apparatus 10. The transmission/reception circuit 52 can also transmit a signal to the input apparatus 10.

The instruction mechanism 54 is, for example, a keyboard, and the user makes initial setting, special setting, and the like by means of this instruction mechanism 54. The instruction mechanism 54 receives various kinds of instructions from the user, and outputs an input signal to the CPU 51.

The CPU 51 executes the functions of the second processing unit which performing processing of the display control unit and processing of the second calculation unit explained below. The CPU 51 controls the manipulation target object displayed on the display apparatus 60, based on various kinds of information received by the transmission/reception circuit 17.

It should be noted that the display apparatus 60 is constituted by, for example, a liquid crystal display and an EL (Electro-Luminescence) display. The display apparatus 60 may be configured to display a two-dimensional image, or may be configured to display a three-dimensional image. The display apparatus 60 displays the manipulation target object manipulated with the input apparatus 10 in a two-dimensional manner or a three-dimensional manner.

Examples of manipulation target objects displayed in the two-dimensional manner include GUI and the like such as a pointer, an icon, and a window. Examples of manipulation target objects displayed in the three-dimensional manner include character images in human-like and animal-like figures displayed in the three-dimensional manner. These examples are merely examples. The manipulation target object may be any image as long as it is an image displayed in the two-dimensional manner or the three-dimensional manner.

It should be noted that the display apparatus 60 may be a television apparatus capable of receiving television broadcast and the like. Alternatively, when the display apparatus 60 is configured to display the manipulation target object in the three-dimensional manner, the display apparatus 60 may be a stereoscopic image display apparatus that displays a stereoscopic image which can be viewed by the user with naked eyes. FIG. 1 shows a case where the control apparatus 50 and the display apparatus 60 are provided separately, or the control apparatus 50 and the display apparatus 60 may be configured integrally.

Subsequently, the functional configuration of the control apparatus 50 will be explained with reference to the lower figure of FIG. 6B. The control apparatus 50 includes a second processing unit 61, a storage unit 63, a second transmission/reception unit 62, and an instruction unit 64. The second processing unit 61 includes a second calculation unit 65 and a display control unit 66.

The second transmission/reception unit 62 transmits or receives predetermined information to/from the first transmission/reception unit 47. The storage unit 63 may be achieved as a RAM 53b or a ROM 53a using, for example, a semiconductor memory, a magnetic disk, or an optical disk.

For example, when the user performs input manipulation using the instruction mechanism 53 such as a keyboard, the instruction unit 64 makes initial setting, special setting, and the like. More specifically, the instruction unit 64 receives various kinds of instructions from the user, outputs the input signal to the second processing unit 61, and instructs initial setting and the like.

The second calculation unit 65 performs desired processing using the calculation result and the detection result provided by the first processing unit 41, and outputs a result to the display control unit 66.

The display control unit 66 controls the display of the manipulation target object based on the obtained information. Instead of the display control unit 66 or in addition to the display control unit 66, a expressing unit capable of expressing operation other than display of the manipulation target object (for example, sound and vibration) may be provided. The expressing unit controls the expression of the target object in response to desired input manipulation using the obtained information.

It should be noted that the functions of the second calculation unit 65 and the display control unit 66 can be achieved when, for example, the CPU 51 operates according to programs stored in the storage unit 63. This program may be stored and provided in a memory medium, and may be read to the storage unit 63 via a driver, not shown. Alternatively, it may be downloaded from a network and stored to the storage unit 63. In order to achieve the function of each of the above units, a DSP (Digital Signal Processor) may be used instead of the CPU. Alternatively, the function of each of the above units may be achieved with operation using software, and may be achieved with operation using hardware.

[Operation of Input Apparatus]

Subsequently, operation of the control system 100 according to the present embodiment will be explained. FIG. 7 is a flowchart illustrating operation of the control system 100 according to the present embodiment. The flowchart in FIG. 7 illustrates the processing of the input apparatus 10, and the lower flowchart of FIG. 7 illustrates the processing of the control apparatus 50.

First, the user raises the input apparatus 10, and moves the input apparatus 10 to a position where the user can easily manipulate the input apparatus 10. At this occasion, the manipulation target object displayed on the display does not move (see NO in step 101). The user indicates intention to start manipulating the input apparatus 10 to grip the gripping portion 23 of the input apparatus main body 20 with a force equal to or more than the predetermined force. Then, the shell-shaped portion 22 (plate 25) of the input apparatus main body 20 and the movable portion 6 of the tact switch 12 are moved in directions closer to the center of the input apparatus 10. When the movable portion 6 of the tact switch 12 moves in a direction toward the center of the input apparatus 10, click feeling is generated by the click feeling generating mechanism.

The input apparatus 10 can appropriately respond to the user's intention of starting manipulation of the manipulation target object using a response based on this click feeling (example of first response). This click feeling allows the user to easily recognize that the manipulation of the manipulation target object is started. The response based on the click feeling generated by the click feeling generating mechanism is a response that does not rely on the CPU, and therefore, the response based on the click feeling can be given back to the user quickly.

When the movable portion 6 of the tact switch 12 moves in the direction toward the center of the input apparatus 10, the click feeling is generated, and the switch mechanism of the tact switch 12 is in ON state, so that a signal is input to the CPU 11 from the switch mechanism (YES in step 101).

When the signal is input from the tact switch 12, the CPU 11 obtains the acceleration value and the angular velocity value from the three-axis acceleration sensor 14 and the three-axis angular velocity sensor 15, and obtains the pressure values from the pressure sensors 13 (step 102).

Subsequently, the CPU 11 executes calculation based on the acceleration value and the angular velocity value, and calculates the amount of movement and the amount of rotation (per predetermined time) of the input apparatus 10 (step 103). The CPU 11 executes calculation using vector calculation and the like based on the pressure values, thus calculating the magnitude of the force with which the input apparatus 10 is gripped (the magnitude of the force applied to the plate 25) and the position to which the force is applied.

Subsequently, the CPU 11 transmits each piece of information calculated (the amount of movement and the amount of rotation of the input apparatus 10, the magnitude of the force with which the input apparatus 10 is gripped, the position to which the force is applied) to the control apparatus 50 via the transmission/reception circuit 17 (step 104).

The CPU 51 of the control apparatus 50 determines whether the each piece of information has been received from the input apparatus 10 (step 201). When the each piece of information is received from the input apparatus 10, the CPU 51 of the control apparatus 50 controls the manipulation target object based on the each piece of information received (step 202). In step 202, the CPU 51 of the control apparatus 50 may further execute calculation on each piece of information received, and may execute processing for improving the accuracy of the control of the manipulation target object.

For example, when the manipulation target object is a character image displayed in a three-dimensional manner, the CPU 51 executes processing for moving and rotating the character image in the three-dimensional manner, based on information about the amount of movement and the amount of rotation of the input apparatus 10 in step 202. The CPU 51 also executes processing for causing the character image to perform particular movement (such as jumping, squatting, laughing, and being angry) according to the information about the magnitude of the force of gripping and the information about the position of the force. How the manipulation target object is controlled based on the information about the amount of movement, the amount of rotation, the magnitude of the force of gripping, and the position of the force is not particularly limited.

With the processing as illustrated in FIG. 7, the user can cause the manipulation target object to make any movement by moving or rotating the input apparatus 10, gripping the input apparatus 10 more strongly, or strongly pressing a particular position of the input apparatus 10 while the user grips the input apparatus 10 with a force equal to or more than the predetermined force.

On the other hand, when the user (temporarily) stops the manipulation of the manipulation target object, the user loosens gripping of the input apparatus 10. When the user loosens gripping of the input apparatus 10, and the gripping force becomes less than the predetermined force, the movable portion 6 of the tact switch 12 and the shell-shaped portion 22 of the input apparatus main body 20 (plate 25) are moved in directions away from the center of the input apparatus 10.

When the movable portion 6 of the tact switch 12 moves in a direction away from the center of the input apparatus 10, click feeling is generated by the click feeling generating unit.

The input apparatus 10 can appropriately respond to the user's intention of stopping manipulation of the manipulation target object using a response based on this click feeling. This click feeling allows the user to easily recognize that the manipulation of the manipulation target object is stopped. When the movable portion 6 of the tact switch 12 moves in the direction away from the center of the input apparatus 10, the click feeling is generated, and the switch mechanism of the tact switch 12 stops outputting the signal. Accordingly, the signal is no longer input from the tact switch 12 to the CPU 11 (NO in step 101), the movement of the manipulation target object stops.

As explained above, in the present embodiment, for example, the user grips the input apparatus 10 with a force equal to or more than the predetermined force or loosens gripping of the input apparatus 10, whereby the user can switch whether manipulation of the input apparatus 10 (spatial manipulation, manipulation based on the magnitude of the gripping force) is reflected to manipulation of the manipulation target object.

The input apparatus 10 according to the present embodiment can appropriately respond to the user's intention of starting manipulation of the manipulation target object using the click feeling generating unit of the tact switch 12. This click feeling allows the user to easily recognize that the manipulation of the manipulation target object is started. The response based on the click feeling generated by the click feeling generating mechanism is a response that does not rely on the CPU 11, and therefore, the response based on the click feeling can be given back to the user quickly.

Further, in the present embodiment, the input apparatus 10 can quickly respond to the user's intention of stopping manipulation of the manipulation target object using a response based on this click feeling. This click feeling allows the user to easily recognize that the manipulation of the manipulation target object is stopped.

Second Embodiment

Subsequently, the second embodiment of the present disclosure will be explained. In the explanation about the second and subsequent embodiments, members and the like having the same configurations and functions as those of the above first embodiment are denoted with the same reference numerals, and description thereabout is omitted or simplified.

[Configuration of Input Apparatus]

Figure 8:
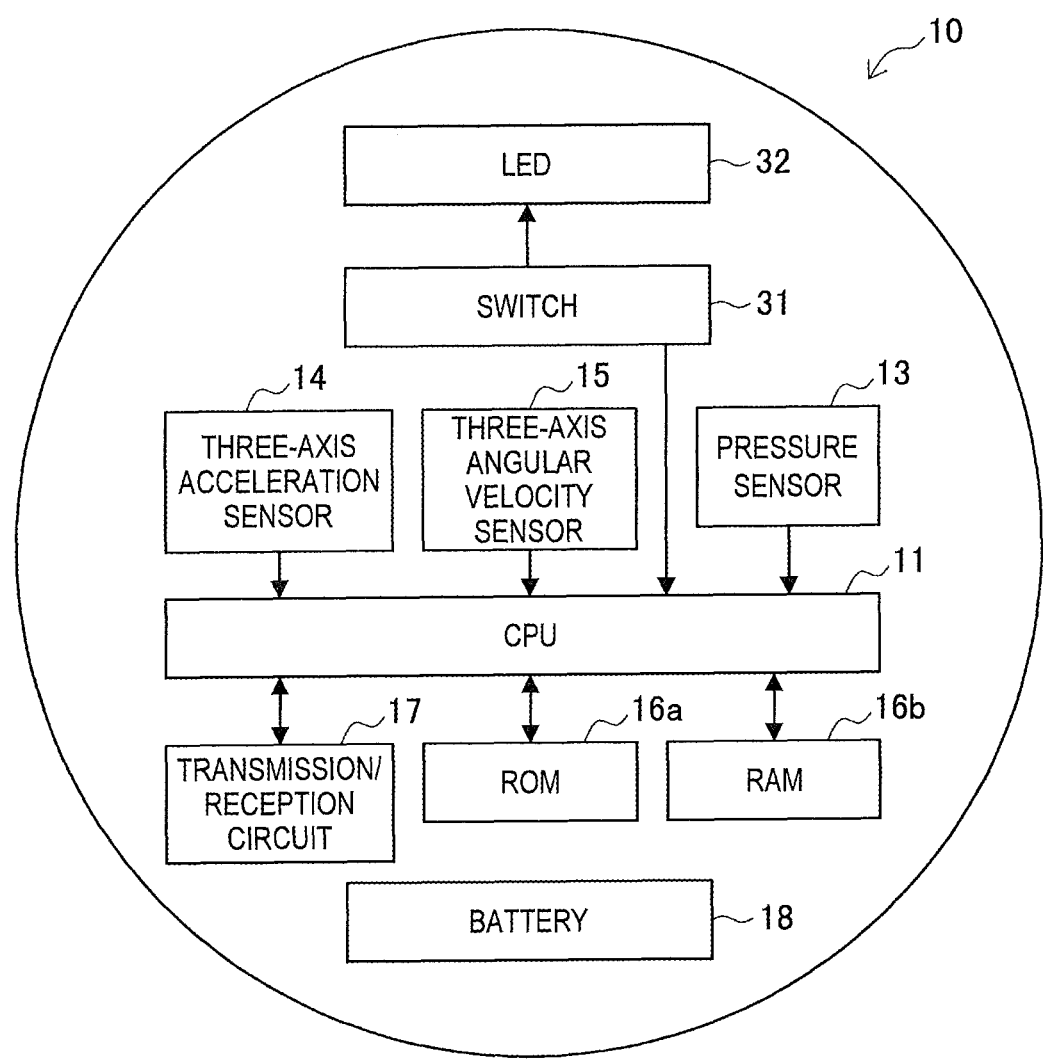
FIG. 8 is a block diagram illustrating an electrical configuration of an input apparatus according to a second embodiment.

FIG. 8 is a block diagram illustrating an electrical configuration of an input apparatus 10 according to the second embodiment. As compared with FIG. 6A illustrating the electrical configuration of the input apparatus 10 according to the first embodiment, the second embodiment illustrated in FIG. 8 is different in that a switch 31 is provided instead of the tact switch 12 and an LED 32 electrically connected to the switch 31 is provided.

The switch 31 is different from the tact switch 12 in that the switch 31 does not include the click feeling generating mechanism in the switch 31, but the switch 31 has the same configuration as the tact switch 12 with regard to the features other than the above. More specifically, the switch 31 includes a switch main body 5, a movable portion 6 capable of moving with respect to the switch main body 5, and an electrical switch mechanism (not shown) that is switched between ON and OFF according to movement of the movable portion 6.

The LED 32 illuminates and turns off according to ON/OFF switching of the switch mechanism of the switch 31. The LED 32 is provided in a hollow portion formed in a base portion 21. Instead of the LED 32, it may be constituted by a light bulb and the like.

In the second embodiment, the base portion 21, a shell-shaped portion 22, and a gripping portion 23 are made with a transparent or semi-transparent material.

[Operation of Input Apparatus]

When the user indicates intention to start manipulating the input apparatus 10 to grip the gripping portion 23 of the input apparatus main body 20 with a force equal to or more than the predetermined force, the movable portion 6 of the switch 31 is moved in a direction closer to the center of the input apparatus 10. When the movable portion 6 of the switch 31 moves in the direction toward the center of the input apparatus 10, the switch mechanism of the switch 31 is in ON state, and the LED 32 illuminates.

In the second embodiment, the input apparatus 10 can appropriately respond to the user's intention of starting manipulation of the manipulation target object using a response based on illumination of the LED 32 (example of first response). The second embodiment is the same as the first embodiment in that the response based on illumination of the LED 32 is a response that does not rely on the CPU, and therefore, the response based on illumination of the LED 32 can be given back to the user quickly.

When the switch mechanism of the switch 31 becomes ON state, a signal is input to the CPU 11. When the CPU 11 receives the signal, the CPU 11 executes various kinds of operations based on detection values of various sensors, and transmits a calculation result to the control apparatus 50. Accordingly, movement of the manipulation target object is controlled when the user manipulates the input apparatus 10 (spatial manipulation, manipulation based on the magnitude of the gripping force of the input apparatus 10, and the like) while the user grips the input apparatus 10 with a force equal to or more than the predetermined force.

While the input apparatus 10 is gripped with a force equal to or more than the predetermined force, the LED 32 continues to illuminate.

On the other hand, when the user loosens gripping of the input apparatus 10, and the gripping force becomes less than the predetermined force, the movable portion 6 of the switch 31 is moved in directions away from the center of the input apparatus 10. Accordingly, the switch mechanism of the switch 31 becomes OFF state, and the LED 32 turns off. This turned-off LED 32 allows the user to easily recognize that the manipulation of the manipulation target object is stopped.

Modification of Second Embodiment

In the above explanation, the LED 32 emitting light is used according to switching of the switch mechanism. However, instead of the LED 32, a sound (voice) generating unit generating sound (voice) or a vibrating unit generating vibration according to switching of the switch mechanism may be used. Alternatively, these may be combined with each other, or may combined with the tact switch 12 (click feeling generating mechanism).

Third Embodiment

Subsequently, the third embodiment of the present disclosure will be explained. In each of the above embodiments, when the user indicates intention to start or stop manipulating the manipulation target object to grip the input apparatus 10 with a force equal to or more than the predetermined force or loosen the gripping force, the response based on the click feeling and the like is given from the input apparatus 10.

In contrast, the third embodiment is different from each of the above embodiments in that, in addition to the response based on the click feeling and the like, the input apparatus 10 gives a response that is different from the response based on the click feeling and the like when, e.g., the user spacially manipulates the input apparatus 10. Therefore, this feature will be mainly explained.

In the explanation in this specification, a response, such as click feeling, that is given in reply to the user's intention of starting (stopping) manipulation of the manipulation target object and that is generated by the input apparatus 10 when the user grips the input apparatus 10 with a force equal to or more than the predetermined force (and when the user loosens gripping) is called a first response. On the other hand, a response generated by the input apparatus 10 when the user spatially manipulates the input apparatus 10 is called a second response.

A member generating a first response regardless of the control of the CPU 11 is called a first response unit, and a member generating a second response regardless of the control of the CPU 11 is called a second response unit.

[Configuration of Input Apparatus]

Figure 9:
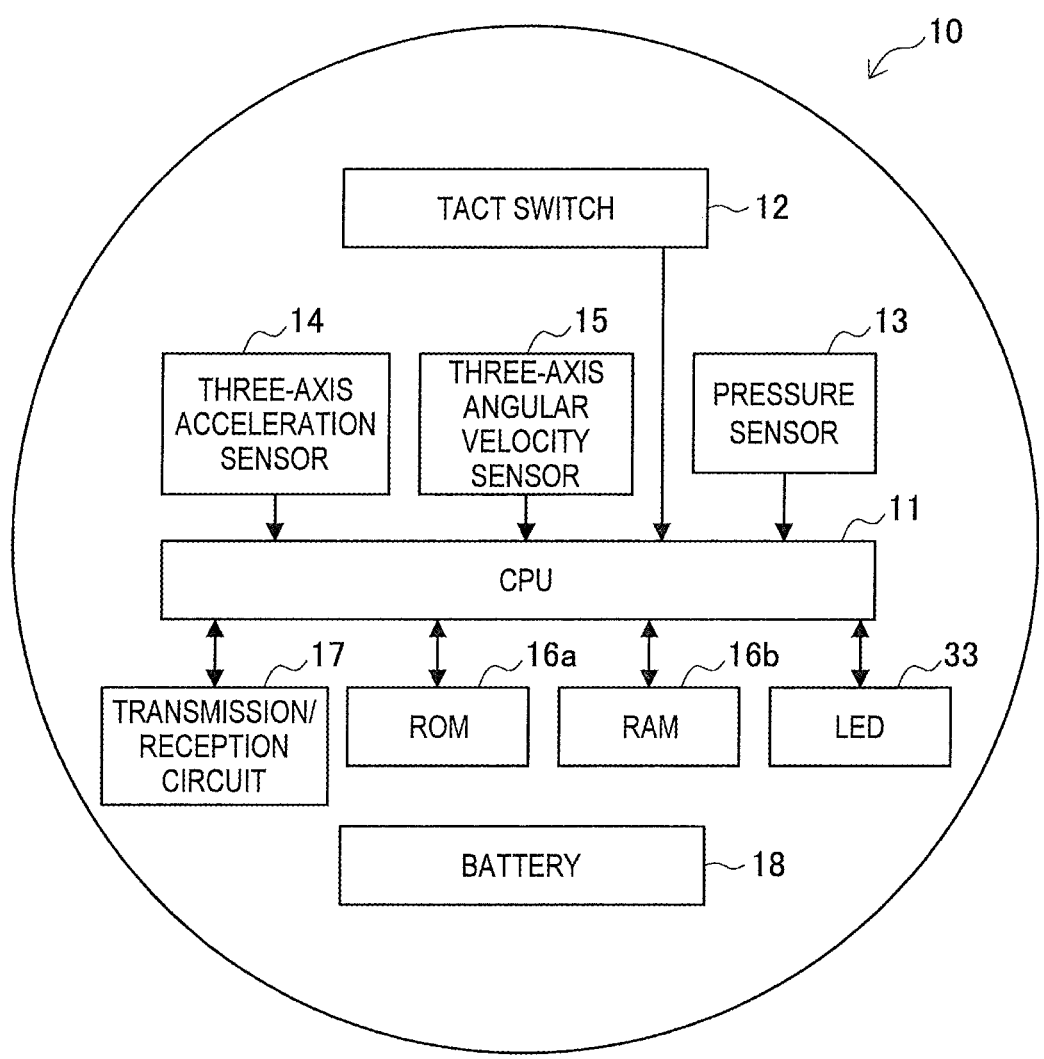
FIG. 9 is a block diagram illustrating an electrical configuration of the input apparatus according to a third embodiment.

FIG. 9 is a block diagram illustrating an electrical configuration of an input apparatus 10 according to the third embodiment. As illustrated in FIG. 9, in the third embodiment, an LED 33 electrically connected to the CPU 11 is provided, but the third embodiment is the same as the first embodiment (see FIG. 6) with regard to the features other than the above.

The LED 33 (example of second response unit) is a member giving a response based on light back to the user, which is a response different from the click feeling, according to the control of the CPU 11. For example, the LED 33 emits light (single color, multiple colors) or blinks (single color, multiple colors) according to the control of the CPU 11. The LED 33 is provided in a hollow portion formed in a base portion 21. Instead of the LED 33, a light bulb may be used.

In the third embodiment, a base portion 21, a shell-shaped portion 22, and a gripping portion 23 are made with a transparent or semi-transparent material.

[Operation of Input Apparatus]

When the user grips the input apparatus 10 with a force equal to or more than the predetermined force, click feeling is generated by a click feeling generating mechanism of a tact switch 12, and the switch mechanism of the tact switch 12 becomes ON state. When the switch mechanism of the tact switch 12 becomes ON state, a signal is input to the CPU 11.

When the CPU 11 receives the signal from the switch mechanism, the CPU 11 obtains an acceleration value, an angular velocity value, and a pressure value from the respective sensors, and calculates the amount of movement and the amount of rotation of the input apparatus 10, the magnitude of the force with which the input apparatus 10 is gripped, the position to which the force is applied, and the like. Then, the CPU 11 transmits a calculation result to the control apparatus 50.

Further, the CPU 11 causes the LED 33 to emit light (single color, multiple colors) or blink (single color, multiple colors) based on the calculation result. For example, when the amount of movement and the amount of rotation of the input apparatus 10 are more than predetermined values, the CPU 11 causes the LED 33 to emit light (single color, multiple colors) or blink (single color, multiple colors) based on the calculation result. For example, when the magnitude of the force with which the input apparatus 10 is gripped is more than a predetermined value, or when the position to which the force is applied is a particular position, the CPU 11 causes the LED 33 to emit light (single color, multiple colors) or blink (single color, multiple colors) based on the calculation result.

Light emission and blinking of the LED 33 based on the amount of movement and the amount of rotation of the input apparatus 10, the magnitude of the gripping force, and the position of the force may be changed such that, e.g., the light emission color and the blinking pattern may be changed so as to avoid causing confusion to the user.

Alternatively, the CPU 11 may execute processing of causing the LED 33 to emit light in different light emission colors with different blinking patterns in multiple steps according to the amount of movement and the amount of rotation of the input apparatus 10 and the magnitude of the force of gripping. Alternatively, the CPU 11 may execute processing of causing the LED 33 to emit light in different light emission colors with different blinking patterns according to the position to which the force is applied.

With the above processing, the input apparatus 10 can appropriately give response based on light (second response) in response to user's manipulation of the input apparatus 10 (spatial manipulation, manipulation based on the magnitude of the gripping force of the input apparatus 10).

In the input apparatus 10 according to the third embodiment, the second response (light) is a response that is different from the first response (click feeling), and therefore, the user would not be confused.

Modification of Third Embodiment

In the above explanation, the LED 33 emitting light has been explained as an example of the second response unit generating the second response according to the control of the CPU 11. However, the second response unit is not limited to the LED 33. Other examples of second response units include a sound (voice) generating unit generating sound (voice), a vibrating unit generating vibration, a heat generating unit generating heat according to the control of the CPU 11. Alternatively, a pseudo acceleration generating unit generating pseudo acceleration according to the control of the CPU and the like may be used as the second response unit. Alternatively, the second response unit may be a combination thereof.

In the third embodiment, a case where the tact switch 12 (click feeling generating unit) is used as an example of the first response unit has been explained. However, the first response unit may be the LED 32 explained in the second embodiment, or may be a sound (voice) generating unit, a vibrating unit, and the like. Alternatively, the first response unit may be a combination thereof.

A combination of the first response unit and the second response unit may be any combination as long as the first response and the second response are different. For example, such a combination may also be possible, in which the first response unit is a vibrating unit and the second response unit is a vibrating unit. In this case, the vibration pattern serving as the first response may be different from the vibration pattern serving as the second response.

The second response may be the same response as the movement of the manipulation target object. For example, processing may be executed to cause the vibrating unit to vibrate when the manipulation target object vibrates.

Fourth Embodiment

Subsequently, the fourth embodiment of the present disclosure will be explained.

In this case, for example, it is assumed that when the user moves the input apparatus 10 in a depth direction or a direction toward the user while the user grips the input apparatus 10 with a force equal to or more than the predetermined force, the manipulation target object displayed by the display apparatus 60 in a three-dimensional manner is enlarged or reduced.

In this case, when the user's arm is stretched out or the user's arm is bent and there is no room left to further stretch or bend the user's arm, the user cannot enlarge or shrink the manipulation target object.

Accordingly, in the input apparatus 10 according to the fourth embodiment, when the input apparatus 10 is gripped with a certain magnitude of force even though the input apparatus 10 is substantially stationary, the processing of moving (enlarging, reducing) the manipulation target object is continued.

Figure 10:
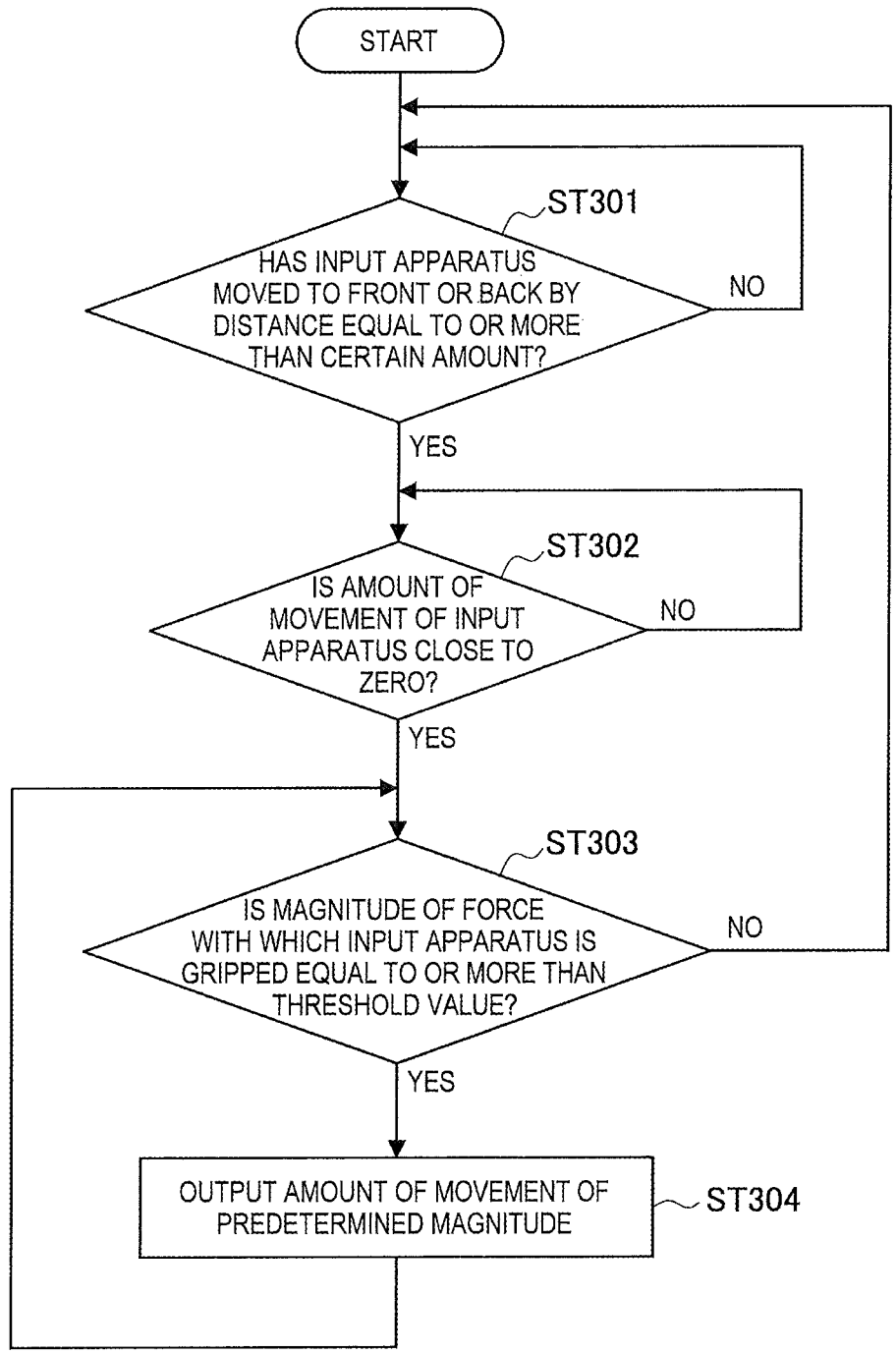
FIG. 10 is a flowchart illustrating operation of the input apparatus according to a fourth embodiment.

FIG. 10 is a flowchart illustrating processing of the input apparatus 10 according to the fourth embodiment. A CPU 11 of the input apparatus 10 determines whether the input apparatus 10 has been moved to the front or the back (the depth direction of the user or the direction toward the user) by a distance equal to or more than a certain amount (step 301).

When the input apparatus 10 is determined to have been moved to the front or the back by a distance equal to or more than a certain amount (YES in step 301), the CPU 11 subsequently determines whether the amount of movement of the input apparatus 10 has attained a value close to zero or not (step 302).

When the amount of movement of the input apparatus 10 is determined to have attained a value close to zero (YES in step 302), a determination is made as to whether the magnitude of the force with which the input apparatus 10 is gripped is equal to or more than the threshold value (step 303). When the magnitude of the force of gripping is determined to be equal to or more than the threshold value (YES in step 303), the CPU 11 of the input apparatus 10 outputs information about the amount of movement of the predetermined magnitude to the control apparatus 50 via the transmission/reception circuit 17 (step 304).

In other words, when the input apparatus 10 is gripped strongly even though the input apparatus 10 is hardly moving, the CPU 11 of the input apparatus 10 deems that the input apparatus 10 is moving, and transmits the information about the amount of movement of the predetermined magnitude to the control apparatus 50. It is to be understood that when the input apparatus 10 is moving to the front or the back, the information about the amount of movement is transmitted from the input apparatus 10 to the control apparatus 50.

When the CPU 51 of the control apparatus 50 receives the information about the amount of movement, processing is executed to, for example, enlarge or reduce the manipulation target object displayed in the three-dimensional manner, based on the information about the amount of movement.

With the processing as illustrated in FIG. 10, even when the user's arm is stretched out or the user's arm is bent and there is no room left to further stretch or bend the user's arm, the user can continue to enlarge or reduce the manipulation target object by strongly gripping the input apparatus 10. When the user wants to stop enlarging or reducing of the manipulation target object, the user may loosen gripping of the input apparatus 10.

In the explanation about the above example, the manipulation target object is enlarged or reduced by moving the input apparatus 10 to the front or the back. However, the input apparatus 10 may be moved in the vertical direction or the horizontal direction. The direction in which the input apparatus 10 is moved is not particularly limited. In the explanation about the above example, the manipulation target object is enlarged or reduced in response to the movement of the input apparatus 10. Alternatively, the manipulation target object may be enlarged or reduced in response to rotation of the input apparatus 10. The direction in which the input apparatus 10 is rotated is not particularly limited. The fifth embodiment explained below is also the same with regard to this point.

In the explanation about the above example, the manipulation target object is enlarged or reduced. However, the present embodiment is not limited thereto. The processing explained in the fourth embodiment can also be applied to, for example, movement of the manipulation target object in a two-dimensional or three-dimensional manner, and can be applied to scrolling and the like when the manipulation target object is a window displayed on a screen. The fifth embodiment explained below is also the same with regard to this point.

Fifth Embodiment

In the explanation about the above fourth embodiment, the movement of the manipulation target object is continued when the user grips the input apparatus 10 more strongly. In contrast, in the fifth embodiment, the movement of the manipulation target object is continued when the user grips the input apparatus 10 more weakly.

Like the fourth embodiment, it is assumed that, in the fifth embodiment, when the user moves the input apparatus 10 in a depth direction or a direction toward the user while the user grips the input apparatus 10 with a force equal to or more than the predetermined force, the manipulation target object displayed in a three-dimensional manner is enlarged or reduced.

Figure 11:
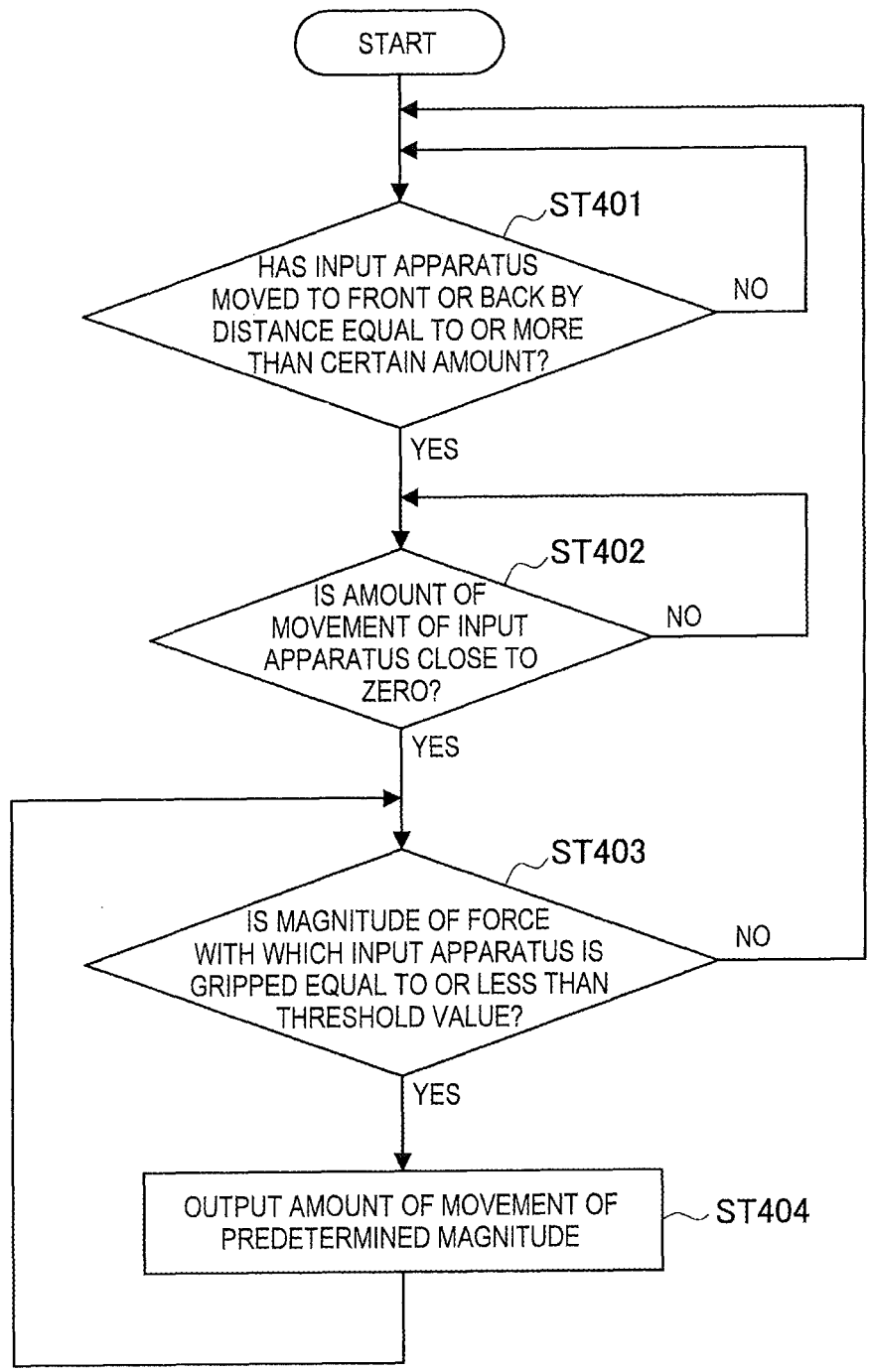
FIG. 11 is a flowchart illustrating operation of the input apparatus according to a fifth embodiment.

FIG. 11 is a flowchart illustrating processing of an input apparatus 10 according to a fifth embodiment. A CPU 11 of the input apparatus 10 determines whether the input apparatus 10 has been moved to the front or the back (the depth direction of the user or the direction toward the user) by a distance equal to or more than a certain amount (step 401).

When the input apparatus 10 is determined to have been moved to the front or the back by a distance equal to or more than a certain amount (YES in step 401), the CPU 11 subsequently determines whether the amount of movement of the input apparatus 10 has attained a value close to zero or not (step 402).

When the amount of movement of the input apparatus 10 is determined to have attained a value close to zero (YES in step 402), a determination is made as to whether the magnitude of the force with which the input apparatus 10 is gripped is equal to or more than the threshold value (step 403). When the magnitude of the force of gripping is determined to be equal to or more than the threshold value (YES in step 403), the CPU 11 of the input apparatus 10 outputs information about the amount of movement of the predetermined magnitude to a control apparatus 50 via a transmission/reception circuit 17 (step 404).

In other words, in contrast to the fourth embodiment, when the input apparatus 10 is gripped weakly (but larger than the force generated with the click feeling and the like), the CPU 11 of the input apparatus 10 according to the fifth embodiment deems that the input apparatus 10 is moving, and transmits the information about the amount of movement of the predetermined magnitude to the control apparatus 50. It is to be understood that when the input apparatus 10 is moving to the front or the back, the information about the amount of movement is transmitted from the input apparatus 10 to the control apparatus 50.

With the processing as illustrated in FIG. 11, even when the user's arm is stretched out or the user's arm is bent and there is no room left to further stretch or bend the user's arm, the user can continue to enlarge or reduce the manipulation target object by weakly gripping the input apparatus 10. When the user wants to stop enlarging or reducing of the manipulation target object, the user may grip the input apparatus 10 more strongly.

Sixth Embodiment

Subsequently, the sixth embodiment of the present disclosure will be explained. In the sixth embodiment, user's correction of spatial manipulation of an input apparatus 10 will be explained.

[Correction for Making Curved Movement of Input Apparatus into Straight Movement]

Figure 12:
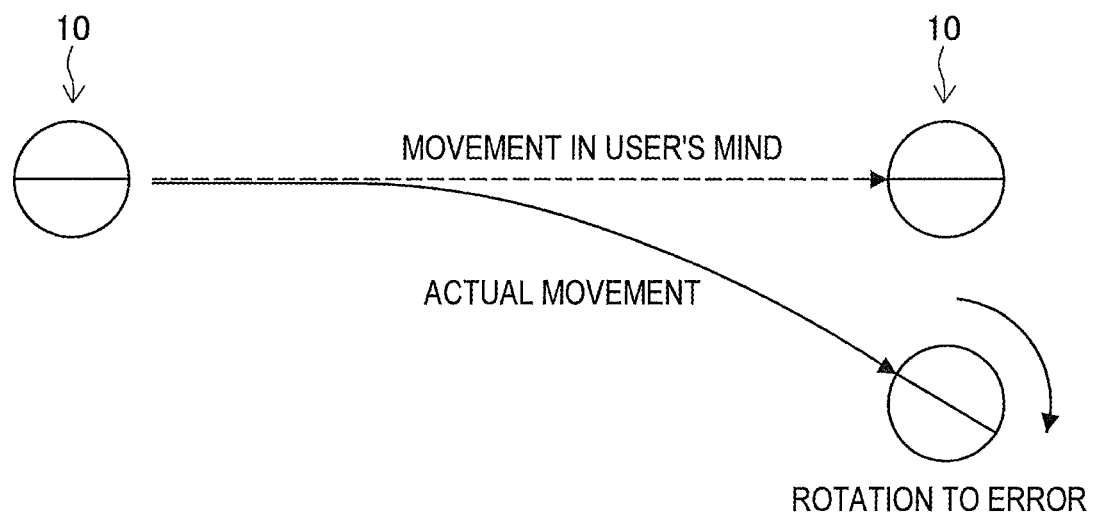
FIG. 12 is a figure for comparing movement of actual movement of the input apparatus and movement of the input apparatus in user's mind when the user moves the input apparatus in space in a sixth embodiment.

FIG. 12 is a figure for comparing movement of actual movement of the input apparatus 10 and movement of the input apparatus 10 in user's mind when the user moves the input apparatus 10 in space.

As illustrated in FIG. 12, when the user grips and moves the input apparatus 10, the input apparatus 10 actually does not move straightly in many cases even though the user is thinking that the user is moving the input apparatus 10 straightly. In this case, in reality, the input apparatus 10 rotates while the input apparatus 10 moves in a curved manner, and there is an error caused by the rotation.

Accordingly, when a CPU 11 of the input apparatus 10 calculates the amount of movement of the input apparatus 10 from an output given by an acceleration sensor 14 (acceleration value), the CPU 11 may use an output given by an angular velocity sensor 15 (angular velocity value) to execute processing of correcting the amount of movement. In other words, when the CPU 11 of the input apparatus 10 calculates the amount of movement of the input apparatus 10, the CPU 11 uses an output of an angular velocity sensor 15 to correct the amount of curved movement of the input apparatus 10 to the amount of straight movement.

In many cases, the rotation of the input apparatus 10 may be a small rotation, and this small rotation is taken into consideration in the above correction.

With the above correction, the movement of the input apparatus 10 is corrected so that it becomes closer to the movement of the input apparatus 10 in user's mind, and therefore, the movement of the manipulation target object becomes closer to the movement in user's mind. Therefore, the user can preferably manipulate the manipulation target object using the input apparatus 10.

[Correction for Making Velocity Constant]

When the user grips and moves the input apparatus 10, the user actually cannot move the input apparatus 10 at a constant speed in many cases even though the user is thinking that the user is moving the input apparatus 10 at a constant speed.

Figure 13:
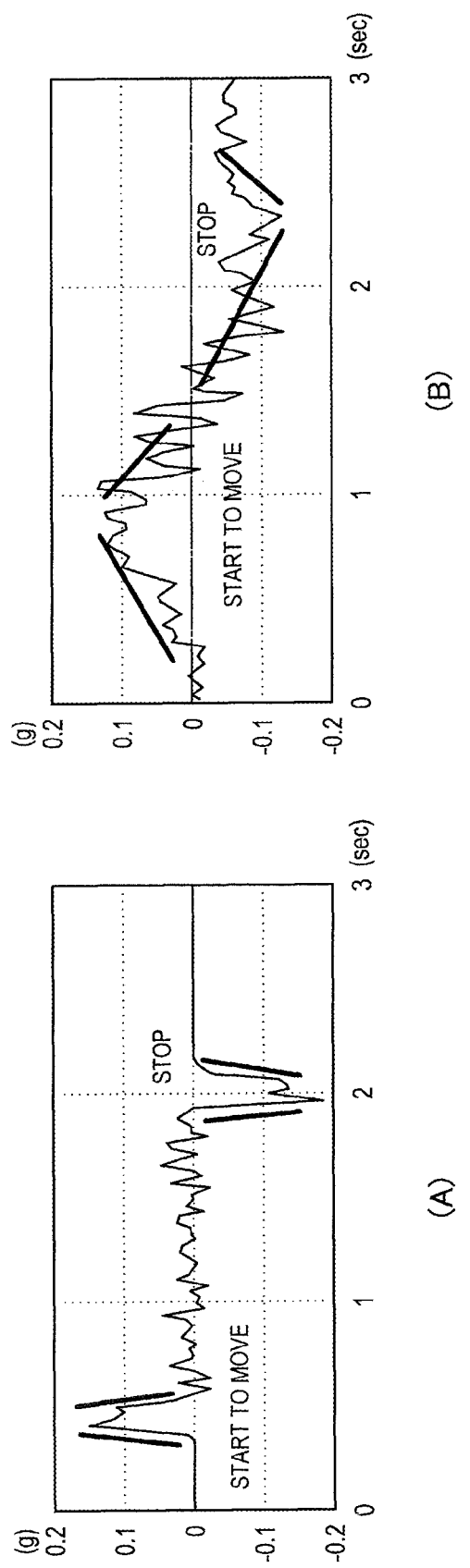
FIGS. 13A and 13B are figures for comparing an output waveform of an acceleration sensor where the input apparatus is moved at a constant speed by a machine (FIG. 13A) and an output waveform of an acceleration sensor where the input apparatus is moved by the user trying to move the input apparatus at a constant speed (FIG. 13B) in the sixth embodiment.

FIGS. 13A and 13B are figures for comparing an output waveform of an acceleration sensor 14 where the input apparatus 10 is moved at a constant speed by a machine (FIG. 13A) and an output waveform of the acceleration sensor 14 where the input apparatus 10 is moved by the user trying to move the input apparatus 10 at a constant speed (FIG. 13B).

As illustrated in FIG. 13A, when the input apparatus 10 is moved by a machine, the input apparatus 10 is rapidly accelerated and starts to move, and attains a constant speed state in a short time. Thereafter, the input apparatus is rapidly decelerated and stopped. On the other hand, as illustrated in FIG. 13B, when the user moves the input apparatus 10, the input apparatus 10 is accelerated gently and starts to move, and is decelerated gently and stopped. As illustrated in FIG. 11B, even though the user is thinking that the user is moving the input apparatus 10 at a constant speed, the input apparatus 10 is not moved at a constant speed in many cases.

Accordingly, the CPU 11 provided in the input apparatus 10 may correct an output of the acceleration sensor 14, thereby executing correction for making the speed of the input apparatus 10 (the amount of movement) constant. Therefore, the speed of the input apparatus 10 (the amount of movement) can be corrected so that it becomes closer to the speed of the input apparatus 10 in user's mind, and therefore, the user can preferably manipulate the manipulation target object using the input apparatus 10.

[Correction for Making Angular Velocity Constant]

Figure 14:
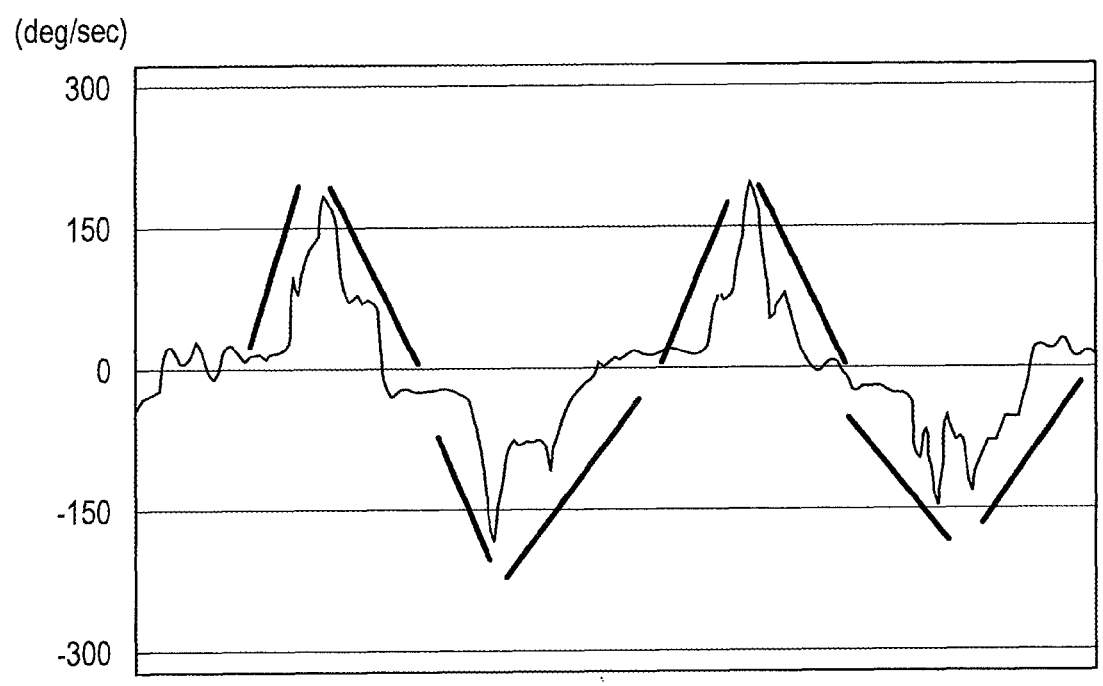
FIG. 14 is a figure illustrating an output waveform of an angular velocity sensor where the input apparatus is rotated by the user who tries to rotate the input apparatus at a constant angular velocity.

FIG. 14 is a figure illustrating an output waveform of the angular velocity sensor 15 where the input apparatus 10 is rotated by the user who tries to rotate the input apparatus 10 at a constant angular velocity.

When the user grips and moves the input apparatus 10, the user actually cannot move the input apparatus 10 at a constant angular velocity in many cases even though the user is thinking that the user is moving the input apparatus 10 at a constant angular velocity.

Accordingly, the CPU 11 provided in the input apparatus 10 may correct an output of the angular velocity sensor 15, thereby executing correction for making the angular velocity of the input apparatus 10 (the amount of rotation) constant.

Therefore, the angular velocity (the amount of rotation) of the input apparatus 10 (the amount of movement) can be corrected so that it becomes closer to the angular velocity in user's mind, and therefore, the user can preferably manipulate the manipulation target object using the input apparatus 10.

As described above, according to the first to sixth embodiments, it is assumed that manipulation is performed while the input apparatus is gripped. However, in the seventh and eighth embodiments explained below, it is not necessary to manipulate an input apparatus while gripping the input apparatus. The first to sixth embodiments are based on the use of the first response (for example, click response). However, the seventh and eighth embodiments may not be based on the first response. Further, in the seventh and eighth embodiments, the first response may not be based on a concept such that a button at a particular position is pressed. Manipulation thereof is detected no matter which portion of the input apparatus is gripped.

Seventh Embodiment

Operation of Input Apparatus

Figure 15:
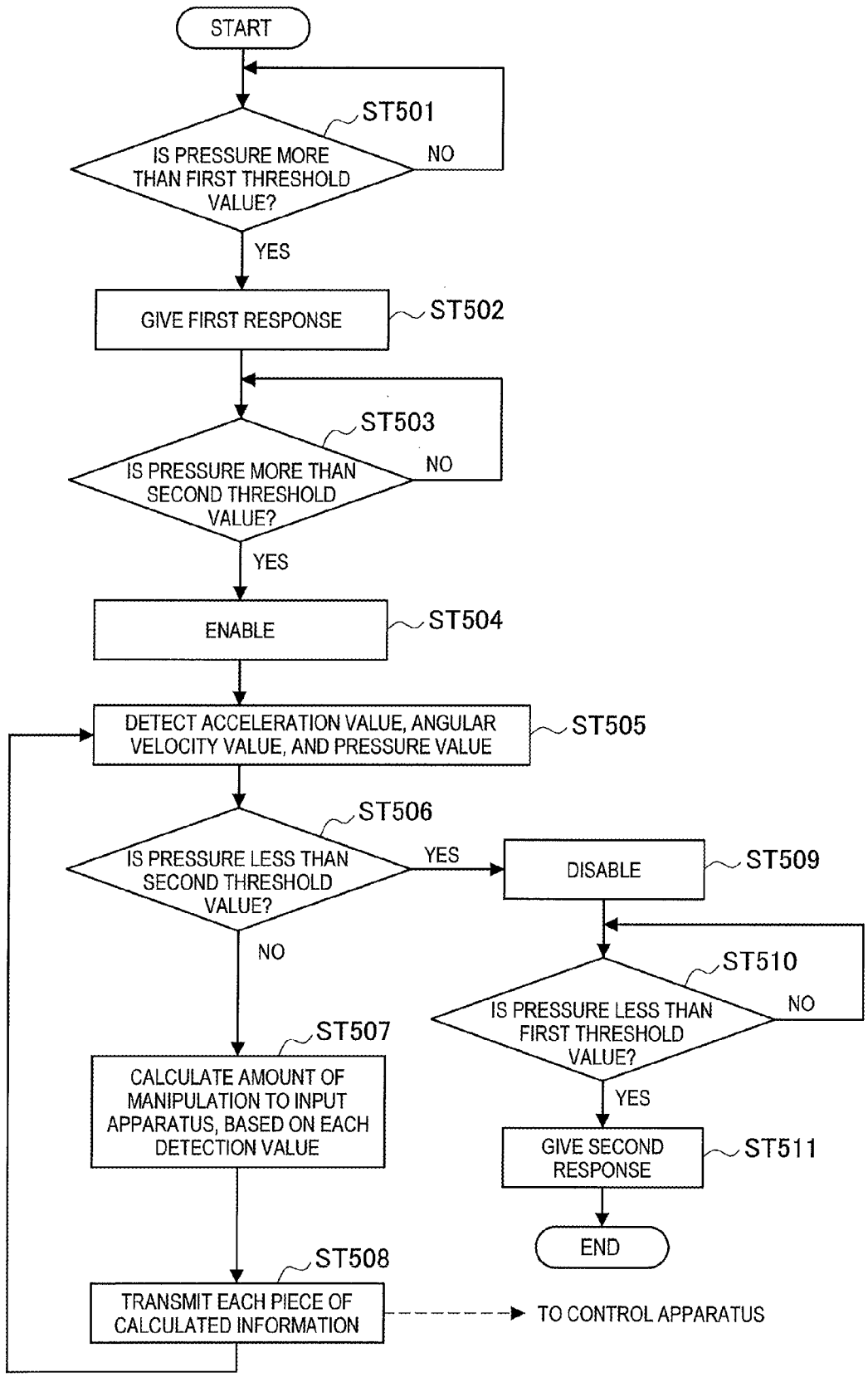
FIG. 15 is a flowchart illustrating operation of the input apparatus according to a seventh embodiment.
Figure 16:
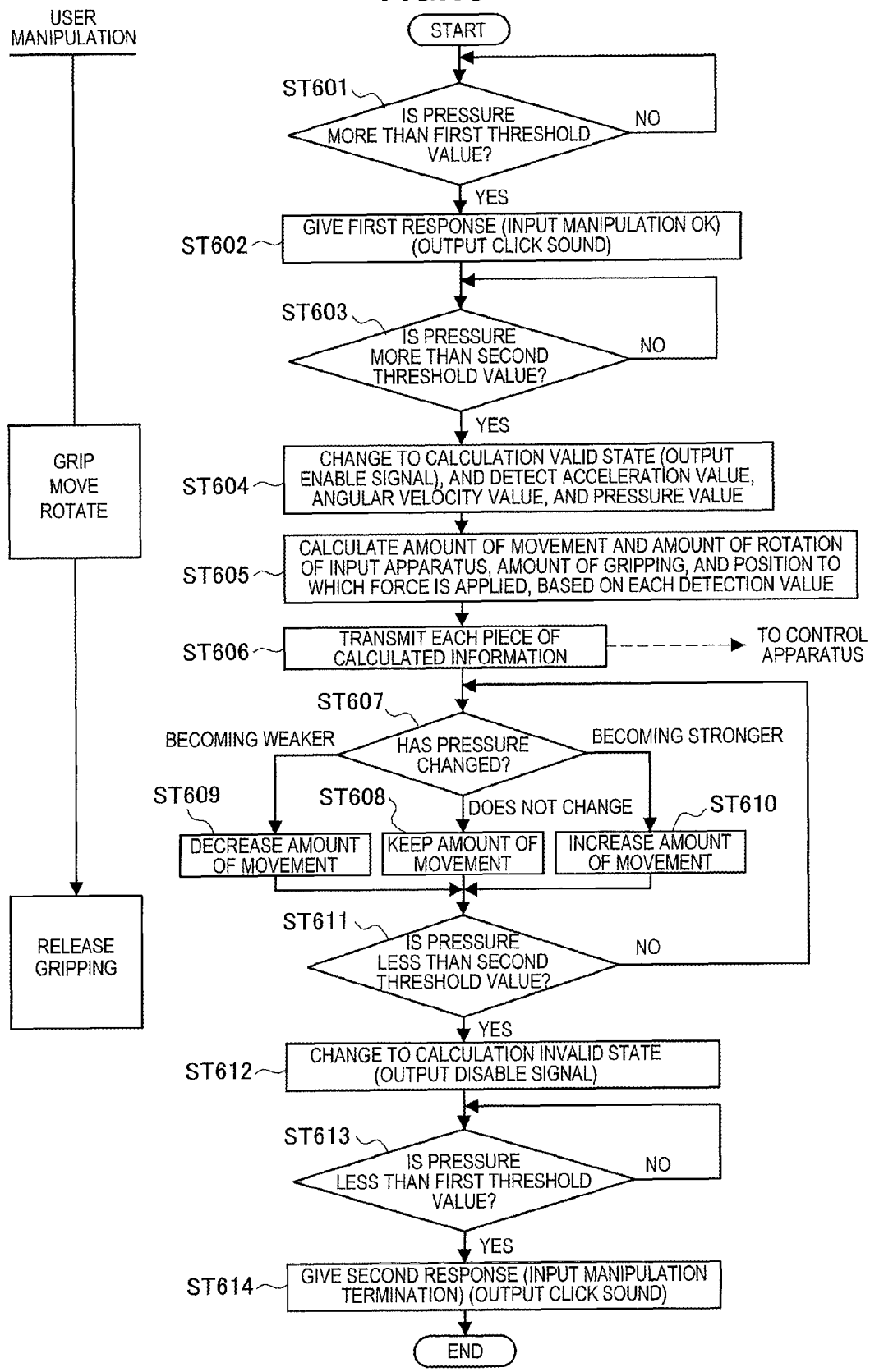
FIG. 16 is a flowchart illustrating operation of the input apparatus according to the seventh embodiment.

First, manipulation of the input apparatus 10 according to the seventh embodiment will be explained. FIGS. 15 and 16 are flowcharts illustrating operation of an input apparatus 10 according to the present embodiment.

First, the first manipulation detection unit 44 detects pressure using the pressure sensor 13, compares the detection value with a given first threshold value, determines whether the user's gripping pressure of the input apparatus 10 is more than the first threshold value (step 501), and repeats the processing of step 501 until the user's gripping pressure is more than the first threshold value. When the gripping pressure is determined to be more than the first threshold value, the first response unit 42 gives back a first response (step 502).

Thereafter, the second manipulation detection unit 45 uses the pressure sensor 13 to detect the pressure, compares the detection value with a given second threshold value, determines whether the gripping pressure is more than the second threshold value (step 503), and repeats the processing of step 503 until the gripping pressure is more than the second threshold value. When the gripping pressure is determined to be more than the second threshold value, the input apparatus 10 changes to enable state (step 504), and a second manipulation detection unit 45 uses an acceleration sensor 14, an angular velocity sensor 15, and a pressure sensor 13 to detect an acceleration, an angular velocity, and a pressure value made in response to user's manipulation (step 505).

Subsequently, the second manipulation detection unit 45 uses the pressure sensor 13 to detect the pressure, compares the detection value with a given second threshold value, and determines whether the gripping pressure is less than the second threshold value (step 506). When the gripping pressure is determined not to be less than the second threshold value, a first calculation unit 40 calculates the amount of manipulation of the input apparatus 10 (the amount of movement, the amount of rotation, and the amount of gripping of the input apparatus 10) based on the detection value detected in step 505 (step 507). A first transmission/reception unit 47 transmits each piece of information about the amount of manipulation calculated to a second transmission/reception unit 62 of a control apparatus 50 (step 508), and returns back to step 505.

On the other hand, when the gripping pressure is determined to be less than the second threshold value in step 506, the input apparatus 10 changes to disable state (step 509). The first manipulation detection unit 44 further determines whether the detection value provided by the pressure sensor 13 is less than a first threshold value (step 510), and when the detection value is determined to be less than the first threshold value, the second response unit 49 replies a second response (step 511), and this processing is terminated.

Accordingly, input manipulation of the manipulation target object can be smoothly achieved without switching ON/OFF of the tact switch 12. In the explanation below, an example of specific operation of the present embodiment will be explained in detail using the flowchart of FIG. 16.

First, like step 501, the first manipulation detection unit 44 uses the pressure sensor 13 to detect a pressure, compares the detection value with a given first threshold value, determines whether the user's gripping pressure of the input apparatus 10 is more than the first threshold value (step 601). When the gripping pressure is determined to be more than the first threshold value, the first response unit 42 gives back a first response (step 602). The first response may be a click sound that indicates permission of input manipulation to the user, or may be a repulsive force generated by the input apparatus 10.

Thereafter, like step 503, the second manipulation detection unit 45 detects pressure using the pressure sensor 13, compares the detection value with a given second threshold value, and determines whether the gripping pressure is more than the second threshold value (step 603). When the gripping pressure is determined to be more than the second threshold value, the second manipulation detection unit 45 outputs an enable signal and changes to calculation valid state, so that the acceleration, the angular velocity, and the pressure value are detected using the acceleration sensor 14, the angular velocity sensor 15, and the pressure sensor 13 in response to user's manipulation such as gripping, moving, and rotating of the input apparatus 10 (step 604).

Subsequently, the first calculation unit 40 calculates the amount of movement and the amount of rotation of the input apparatus 10, the amount of gripping, the position to which the force is applied, based on each detection value detected in step 604 (step 605). The first transmission/reception unit 47 transmits the amount of movement, the amount of rotation, the amount of gripping, the position to which the force is applied, which have been calculated, to the second transmission/reception unit 62 of the control apparatus 50 (step 606).

Subsequently, the second manipulation detection unit 45 uses the pressure sensor 13 to further detect the gripping pressure applied to the input apparatus 10, and determines whether the detection value has been changed (step 607). When the detection value is determined not to have been changed, the first calculation unit 40 keeps the amount of movement of the manipulation target object at the amount of movement calculated (step 608). When the pressure is determined to have decreased, the first calculation unit 40 reduces the amount of movement of the manipulation target object (step 609), and when the pressure is determined to have increased, the first calculation unit 40 increases the amount of movement of the manipulation target object (step 610).

Subsequently, second manipulation detection unit 45 uses the pressure sensor 13 to detect the gripping pressure, compares the detection value with a given second threshold value, and determines whether the gripping pressure is less than the second threshold value (step 611). When the gripping pressure is determined not to be less than the second threshold value, step 607 is performed again, and processing of steps 607 to 611 is repeated.

In this case, the user releases the gripping, and therefore, the gripping pressure is determined to be less than the second threshold value in step 611. In this case, the second manipulation detection unit 45 outputs a disable signal, and changes to calculation invalid state (step 612). The first manipulation detection unit 44 further determines whether the detection value provided by the pressure sensor 13 is less than a first threshold value (step 613), and when the detection value is determined to be less than the first threshold value, the second response unit 49 replies a second response (step 614), and this processing is terminated. The second response may be a click sound that indicates termination of input manipulation to the user, or may be a repulsive force generated by the input apparatus 10.

According to the present embodiment, the user provides the input apparatus, the input method, and the control system with which the manipulation target object can be manipulated as desired, so that coziness and comfort of manipulation can be given to the user. According to the present embodiment, input manipulation of the manipulation target object can be smoothly achieved without switching ON/OFF of the tact switch 12. In the present embodiment, it is not necessary for the user to manipulate while the user continues to grip the input apparatus 10, and the user can perform manipulation such as rotating and moving of the input apparatus 10 while the user is not gripping the input apparatus 10. This makes the user's input manipulation easy, and allows the user to comfortably, remotely manipulate the manipulation target object without making the user tired.

When the enable signal is output, calibration and the like may be performed in order to stabilize the calculation value as necessary. The timing of the output of the disable signal and the timing of the second response (for example, click sound) may be at the same time or may be different as necessary. The first response and the second response may not be emitted.

Eighth Embodiment

Operation of Input Apparatus

Figure 17:
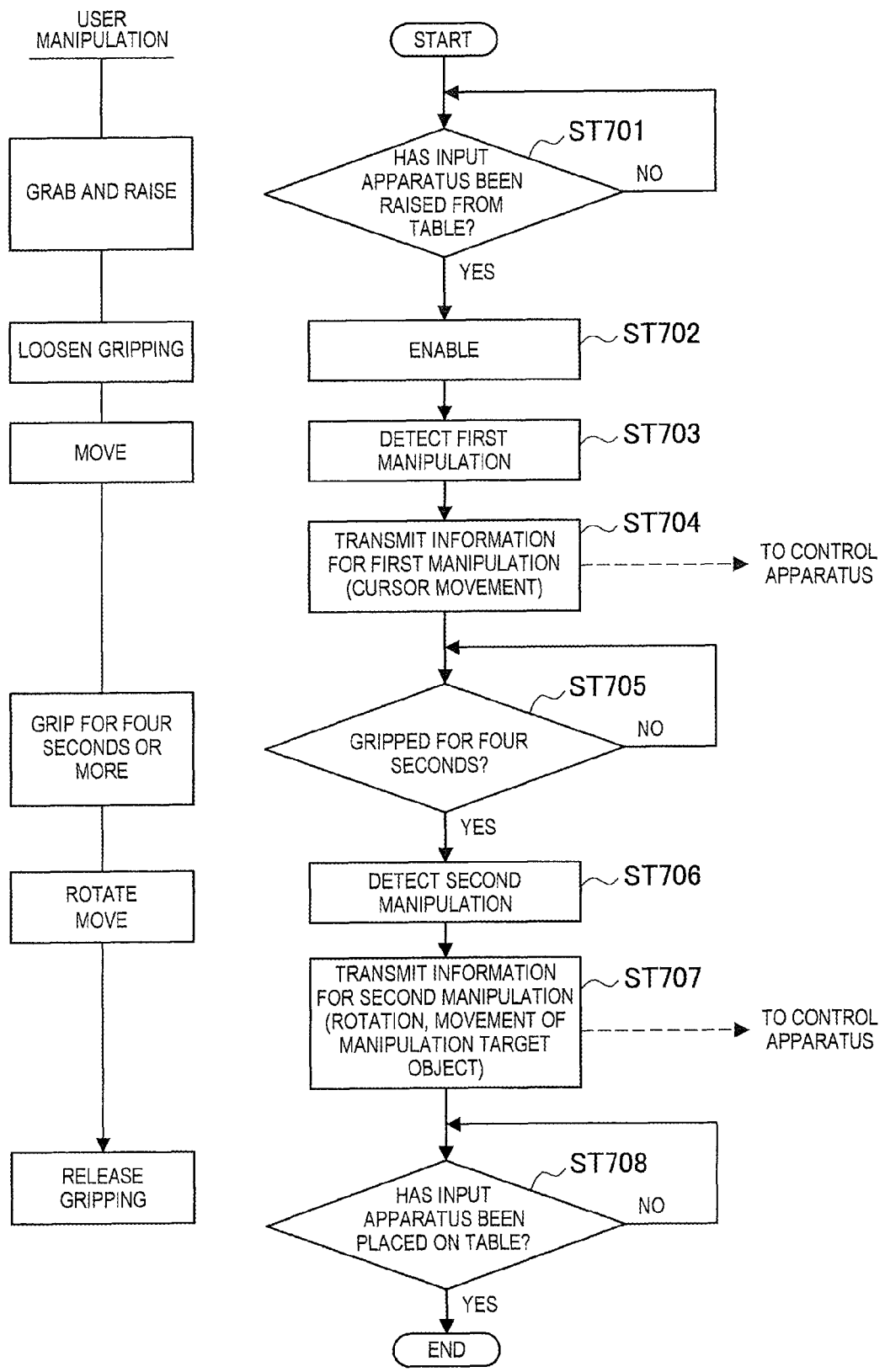
FIG. 17 is a flowchart illustrating operation of the input apparatus according to an eighth embodiment.

Subsequently, operation of an input apparatus 10 according to the eighth embodiment will be explained. FIG. 17 is a flowchart illustrating operation of the input apparatus 10 according to the present embodiment.

First, a first manipulation detection unit 44 uses a pressure sensor 13 to detect a pressure, determines whether the input apparatus 10 has been raised from a table on the basis of the detection value (step 701), and repeats processing of step 701 until the input apparatus 10 is raised from the table. When the input apparatus 10 is raised from the table, the input apparatus 10 changes to enable state (step 702), and the first manipulation detection unit 44 detects a first manipulation (step 703). Examples of first manipulation include detecting an acceleration, an angular velocity, and a pressure value corresponding to user's manipulation using the acceleration sensor 14, the angular velocity sensor 15, and the pressure sensor 13. In this case, the user loosens gripping of the input apparatus 10, and thereafter, performs operation of moving the input apparatus 10. Therefore, the first manipulation detection unit 44 detects the acceleration using the acceleration sensor 14, and a first calculation unit 40 calculates, for example, the amount of movement of the cursor, based on the acceleration detected. Subsequently, the first transmission/reception unit 47 transmits information (the amount of movement of the cursor) for the first manipulation (cursor movement) to the control apparatus 50 (step 704).

Subsequently, the second manipulation detection unit 45 uses the pressure sensor 13 to detect the pressure, determines whether the input apparatus 10 is gripped for four seconds based on the detection value (step 705), and repeats processing of step 705 until the input apparatus 10 is gripped for four seconds. When the input apparatus is determined to have been gripped for four seconds, the second manipulation detection unit 45 detects the second manipulation (step 706). Examples of second manipulation include detecting an acceleration, an angular velocity, and a pressure value corresponding to user's manipulation using the acceleration sensor 14, the angular velocity sensor 15, and the pressure sensor 13. In this case, the user loosens gripping of the input apparatus 10, and thereafter, performs operation of moving the input apparatus 10 while rotating the input apparatus 10. Therefore, the second manipulation detection unit 45 detects the acceleration and the angular velocity using the acceleration sensor 14 and the angular velocity sensor 15, and a first calculation unit 40 calculates the amount of rotation and the amount of movement, based on the acceleration and the angular velocity detected. Subsequently, the first transmission/reception unit 47 transmits information (the amount of rotation, the amount of movement) for the second manipulation (manipulation of the manipulation target object) to the control apparatus 50 (step 707).

Subsequently, the first manipulation detection unit 44 uses the pressure sensor 13 to detect the gripping pressure, and determines whether the input apparatus 10 is placed on a table (step 708). In this case, the user releases the gripping, and the input apparatus 10 is placed on the table. Therefore, in this case, the first manipulation detection unit 44 determines that the input manipulation of the input apparatus 10 is finished, and this processing is terminated.

It should be noted that the determination made in step 701 serving a first action for detecting the first manipulation is not limited to the above determination. Various kinds of determination methods such as a determination as to whether the input apparatus 10 is tapped or not and a determination as to whether the input apparatus 10 is gripped twice (or for two seconds and the like) may be used.

Likewise, various kinds of determination methods may be used as the determination made in step 705 serving a second action for detecting the second manipulation. The detection of the second manipulation is not limited to the detection content. For example, the input apparatus 10 may be rotated to rotate the manipulation target object, the input apparatus 10 may be moved to the left and the right to move the manipulation target object, or the input apparatus 10 may be moved back and forth to zoom in to the manipulation target object.

In the present embodiment, it is not necessary for the user to manipulate while the user continues to grip the input apparatus 10, and the user can perform manipulation such as rotating and moving of the input apparatus 10 while the user is not gripping the input apparatus 10. This makes the user's input manipulation easy, and allows the user to comfortably, remotely manipulate the manipulation target object without making the user tired.

In the above operation, when the mode of the application is changed to enable or disable, the determination is made using the detection result of the selected first manipulation detection unit 44. Accordingly, more intuitive manipulation can be achieved when a series of operation during run and stop of an application.

[Example of First Manipulation, Second Manipulation]

It should be noted that relationship between manipulation of the manipulation target object and manipulation of the input apparatus 10 is not limited to relationship between manipulation of the manipulation target object and the first manipulation and the second manipulation explained above.

For example, FIG. 18 illustrates an example of first manipulation and an example of second manipulation. In the example of first manipulation, user's manipulation may be as follows:

Example 1: the user raises the input apparatus 10 from a table.
Example 2: the user taps the input apparatus 10.
Example 3: the user grips the input apparatus 10 the number of times specified (for example, twice).
Example 4: the user grips the input apparatus 10 for a specified period of time (for example, two seconds).

In the above cases, the first manipulation detection unit 44 may determine that the first manipulation has been detected. In this case, manipulation such as moving of a cursor is made on the display 60a of the display apparatus 60.

In the example of second manipulation, when user's manipulation of the input apparatus 10 is such that the user grips and manipulates the input apparatus 10 (for example, the user grips and shakes the input apparatus 10), the second manipulation detection unit 45 may determine that the second manipulation has been detected. In this case, manipulation such as activating a predetermined application is performed.

The upper figure of FIG. 19 illustrates the example of first manipulation and the example of second manipulation in a case of a single application. The lower figure of FIG. 19 illustrates the example of first manipulation and the example of second manipulation in a case of multiple applications.

In the example of first manipulation in the case of the single application as illustrated in the upper figure of FIG. 19, user's manipulation may be as follows:
Example 1: the user raises the input apparatus 10 from a table.
Example 2: the user grips the input apparatus 10 the number of times specified (for example, three times). In this case the first manipulation detection unit 44 may determine that the first manipulation has been detected. As a result, a predetermined application is activated, and standby state is attained. For example, an application of map information is activated, and the map information is displayed on the display 60a of the display apparatus 60 in such a manner that the map information can be manipulated.

In the example of second manipulation, when user's manipulation of the input apparatus 10 is such that the user grips and manipulates the input apparatus 10 (for example, the user grips and shakes the input apparatus 10), the second manipulation detection unit 45 determines that the second manipulation has been detected. As a result, a predetermined application is manipulated. For example, the map information displayed on the display 60a is manipulated (the same application).

In the example of first manipulation in the case of multiple applications as illustrated in the lower figure of FIG. 19, when user's manipulation of the input apparatus 10 is such that the user grips and manipulates the input apparatus 10 (for example, the user grips and shakes the input apparatus 10), the second manipulation detection unit 45 determines that the first manipulation has been detected. As a result, a predetermined application is manipulated. For example, the map information displayed on the display 60a is manipulated.

In the example of second manipulation, user's manipulation may be as follows:
Example 1: the user raises the input apparatus 10 from a table.
Example 2: the user grips the input apparatus 10 the number of times specified (for example, three times).

In this case, another application is activated. For example, an application of guide information is activated, and the guide information is displayed on the display 60a (different application).

In addition, relationship between manipulation of the manipulation target object and manipulation of the input apparatus 10 is considered to be as follows. Subsequent manipulation of the input apparatus 10 may be the first manipulation or the second manipulation.

When the manipulation target object does not move while it is displayed on the display, the user performs no manipulation while the input apparatus 10 is left placed on a table and the like.

When the user wants to touch the manipulation target object, the user raises the input apparatus 10 and holds it at hand.

When the user wants to come closer to the manipulation target object, the user moves the input apparatus 10, so that the input apparatus 10 is in a cursor movement mode.

When the user wants to grab the manipulation target object, the user grips the input apparatus 10 to such an extent that the amount of sensor equal to or more than a certain level is detected by a sensor.

When the manipulation target object is manipulated, the user rotates the input apparatus 10 or moves the input apparatus 10 to the right and left.

When the user carefully observes the manipulation target object, the user moves the input apparatus 10 to the front or the back to perform manipulation of zoom in or zoom out.

When the user releases the manipulation target object, the user places the input apparatus 10 at an original position such as on a table.

(Advantages)

According to each embodiment explained above, when the manipulation target object is manipulated, the user directly manipulates the input apparatus with hands, legs and the like, so that the user can more preferably manipulate the manipulation target object. For example, the user can manipulate the manipulation target object in a more intuitive manner with manipulations such as gripping and rotating the input apparatus 10. In particular, successive manipulation based on user's intention can be performed speedily as follows: detection of the first manipulation, response or target object manipulation calculation, detection of the second manipulation, and target object manipulation calculation.

The input apparatus 10 is configured such that the sensor does not come into contact with the material that greatly deforms according to input manipulation by a person (input apparatus main body), so that the input apparatus main body is highly durable.

In particular, when a person manipulates the input apparatus 10 with a hand, the action of gripping the input apparatus 10 can be synchronized with the result of gripping the manipulation target object displayed remotely, so that more intuitive manipulation can be achieved.

With two means, i.e., the first response based on click sound and the like and the setting of the predetermined pressure using the detection value provided by the pressure sensor, the manipulation target object in a virtual space is associated with gripping (grabbing, selecting), so that more intuitive manipulation can be achieved.

In each of the above embodiments, the detection unit 43 is configured to be able to obtain detection values from multiple sensors, and therefore, for example, a mode of an application is enabled using a detection result provided by the first manipulation detection unit 44, and in operation state after the enabling, the second manipulation detection unit 45 uses a result obtained by selecting required detection values from among multiple detection values to output information for manipulating the target object. Therefore, this also enables more intuitive manipulation.

It should be understood by those skilled in the art that various modifications, combinations, sub-combinations and alterations may occur depending on design requirements and other factors insofar as they are within the scope of the appended claims or the equivalents thereof.

[Various Kinds of Modifications]

For example, the input apparatus 10 can be used to do the same input as the input achieved with an arrow key provided on a remote controller of a television apparatus. In this case, when the user rotates the input apparatus 10 upward, downward, and to the right and left, processing corresponding to pressing of the up/down/right/left keys of the arrow key may be executed.

When the input apparatus 10 is moved upward, downward, and to the right and left while the user strongly grips the input apparatus 10, processing corresponding to repeated pressing of the up/down/right/left keys of the arrow key may be executed. Alternatively, when the user moves the input apparatus 10 upward, downward, and to the right and left, and thereafter the user loosens gripping of the input apparatus 10 and grips the input apparatus 10 again, processing corresponding to repeated pressing of the up/down/right/left keys of the arrow key may be executed. In this case, when the user loosens gripping of the input apparatus 10, the input apparatus 10 generates click feeling, and in addition, when the user grips the input apparatus 10 again, the input apparatus 10 generates click feeling.

In the explanation, the input apparatus 10 is wireless. However, the input apparatus 10 may use a wire.

In the above explanation, the base portion 21, the shell-shaped portion 22, and the gripping portion 23 of the input apparatus 10 are in a spherical shape. However, the base portion 21, the shell-shaped portion 22, and the gripping portion 23 may be in a polyhedral shape.

In the above explanation, for example, the pressure sensor 13 is used. However, instead of the pressure sensor 13, an electrostatic sensor may be used.

The electrostatic sensor is configured, for example, to be able to read change of a capacitance according to distance. The electrostatic sensor detects the amount of proximity of a hand when the user grips the input apparatus 10, so that the magnitude of the force with which the input apparatus 10 is gripped can be detected. This electrostatic sensor is, for example, in a spherical or polyhedral shape. The electrostatic sensor is configured not to come into contact with the gripping portion 23. Therefore, this can prevent deterioration such as wear caused by manipulation with a hand.

It should be noted that both of the pressure sensor 13 and the electrostatic sensor may be used. In this case, for example, the electrostatic sensor detects a very small force that cannot be detected by the pressure sensor 13, so that a sensor configuration can be achieved with a higher sensitivity (wider detection range).

The input apparatus 10 may include a power generation device (not shown) capable of generating power according to movement or rotation when the user moves or rotates the input apparatus 10 in space. Alternatively, the input apparatus 10 may have a loop coil and the like that generate power using electromagnetic waves provided from the outside. The electric power generated by this power generation device and the loop coil is charged to the battery 18. Therefore, it is not necessary for the user to replace the battery 18.

In the explanation about the above example, the three-axis acceleration sensor 14 and the three-axis angular velocity sensor 15 are used as the detection unit and the pressure sensor 13 and/or the electrostatic sensor are used as the gripping force detection unit. In this case, the detection unit is not limited to the three-axis acceleration sensor 14 and the three-axis angular velocity sensor 15. Other examples of detection unit include a speed sensor (for example, a pitot tube), an angle sensor (for example, a magnetic field sensor), and an angular acceleration sensor. In the explanation about the above example, the detection unit detects movement, and detects gripping. Alternatively, the detection unit may detect any one of them (except the fourth, fifth embodiments).

In the explanation, the manipulation target object is an image displayed on the display in a two-dimensional manner or a three-dimensional manner. However, the manipulation target object is not limited thereto. For example, the manipulation target object may be a physical object such as a transfer robot and a humanoid robot.

Additionally, the present technology may also be configured as below.

(1) An input apparatus including:

an input apparatus main body with which input manipulation is performed to manipulate a manipulation target object;

a first manipulation detection unit that detects a first manipulation on the input apparatus main body;

a second manipulation detection unit that detects a second manipulation on the input apparatus main body after the first manipulation is detected; and a first processing unit that performs first processing for manipulation on the manipulation target object or a first response of the input apparatus, based on a movement detection value corresponding to movement of the input apparatus main body according to the first manipulation or a detection value of the first manipulation, wherein after the first manipulation is detected, second processing for manipulation on the manipulation target object or the first response of the input apparatus is performed based on a movement detection value corresponding to movement of the input apparatus main body according to the second manipulation or a detection value of the second manipulation.

(2) The input apparatus according to (1), wherein the first manipulation detection unit and the second manipulation detection unit detect that the input apparatus main body is gripped with a pressure equal to or more than a predetermined pressure.

(3) The input apparatus according to (1) or (2), wherein the first processing unit includes a first response unit for giving a first response of the input apparatus based on detection of the first manipulation and a first calculation unit for performing calculation for manipulation of the manipulation target object, based on the movement detection value corresponding to the movement of the input apparatus main body according to the second manipulation.

(4) The input apparatus according to (3), wherein the first response of the input apparatus given by the first response unit is not transmitted/received to/from a control apparatus controlling the manipulation target object, and the calculation result for manipulation of the manipulation target object provided by the first calculation unit is transmitted/received to/from the control apparatus.

(5) The input apparatus according to (4), wherein the first response processing performed by the first response unit is faster than processing based on the calculation result obtained by the first calculation unit.

(6) The input apparatus according to any one of (1) to (5), wherein the first processing and the second processing are different kinds of manipulations.

(7) The input apparatus according to (1) or (2), wherein the first processing unit includes a first calculation unit for performing calculation for manipulation of the manipulation target object, based on movement detection in response to the movement of the input apparatus main body according to the first manipulation and a second response unit for giving the second response of the input apparatus based on detection of the second manipulation.

(8) An input method including:
  detecting a first manipulation on an input apparatus main body with which input manipulation is performed to manipulate a manipulation target object;
  detecting a second manipulation on the input apparatus main body after the first manipulation is detected;
  performing first processing for manipulation on the manipulation target object or a first response of the input apparatus, based on a movement detection value corresponding to movement of the input apparatus main body according to the first manipulation or a detection value of the first manipulation; and
  performing, after the first manipulation is detected, second processing for manipulation on the manipulation target object or the first response of the input apparatus, based on a movement detection value corresponding to movement of the input apparatus main body according to the second manipulation or a detection value of the second manipulation.

(9) A control system including:
  an input apparatus which includes
    an input apparatus main body with which input manipulation is performed to manipulate a manipulation target object,
    a first manipulation detection unit that detects a first manipulation on the input apparatus main body,
    a second manipulation detection unit that detects a second manipulation on the input apparatus main body after the first manipulation is detected, and
    a first processing unit that performs first processing for manipulation on the manipulation target object or a first response of the input apparatus, based on a movement detection value corresponding to movement of the input apparatus main body according to the first manipulation or a detection value of the first manipulation; and
  a control apparatus which controls the manipulation target object according to manipulation of the input apparatus,
  wherein, after the first manipulation is detected, the input apparatus performs second processing for manipulation on the manipulation target object or the first response of the input apparatus, based on a movement detection value corresponding to movement of the input apparatus main body according to the second manipulation or a detection value of the second manipulation, and
  wherein the control apparatus controls the manipulation target object, according to the first processing or the second processing performed by the input apparatus.

(10) The input apparatus according to (3),
  wherein the first or second manipulation detection unit detects that the input apparatus main body is gripped by a user with a force equal to or more than the predetermined force,
  wherein the first processing unit detects movement of the input apparatus main body, and outputs a movement detection value according to the movement of the input apparatus main body, and the first processing unit executes processing for controlling the manipulation target object, based on the movement detection value while it is detected that the input apparatus main body is gripped, and
  wherein, when at least the detection unit detects that the input apparatus main body is gripped, the first response unit gives a first response to the user without relying on control of the first processing unit.

(11) The input apparatus according to any one of (1) to (10), wherein the input apparatus main body includes
  a base portion having a surface, and
  a shell-shaped portion including a surface and an inner surface facing the surface of the base portion with a gap therebetween and formed to cover the surface of the base portion,
  wherein the input apparatus further includes a switch portion provided between the surface of the base portion and the inner surface of the shell-shaped portion,
  wherein the detection unit is a switch mechanism constituting a portion of the switch portion, and
  wherein the first response unit is a click feeling generating mechanism constituting a portion of the switch portion and generating click feeling as the first response.

(12) The input apparatus according to (11),
  wherein the detection unit is provided between the surface of the base portion and the switch portion, detects a magnitude of force with which the input apparatus is gripped, and outputs a detection value according to the magnitude of the force of gripping.

(13) The input apparatus according to (12),
  wherein the input apparatus main body further includes a gripping portion provided to cover a surface of the shell-shaped portion, and is made of a material softer than the base portion and the shell-shaped portion.

(14) The input apparatus according to any one of (10) to (13),
  wherein the first response unit gives the first response to the user when the detection unit detects that the input apparatus is gripped and when the detection unit no longer detects that the input apparatus is gripped.

(15) The input apparatus according to any one of (10) to (14),
  wherein the first processing unit further includes a second response unit giving the user a second response that is different from the first response, according to control of the first processing unit.

(16) The input apparatus according to (15),
  wherein the detection unit detects a magnitude of the force with which the input apparatus is gripped, and outputs a gripping force detection value according to the magnitude of the force of gripping, and
  wherein the first processing unit controls the second response given by the second response unit, based on the movement detection value or the gripping force detection value.

(17) The input apparatus according to any one of (10) to (16),
  wherein the detection unit detects a magnitude of the force with which the input apparatus main body is gripped, and outputs a gripping force detection value according to the magnitude of the force of gripping, and
  wherein the first processing unit executes processing for controlling the manipulation target object, based on the movement detection value and the gripping force detection value while it is detected that the input apparatus main body is gripped.

(18) The input apparatus according to (17),
  wherein, when the movement detection value represents a value close to zero, the first processing unit executes processing for continuing movement of the manipulation target object, based on the gripping force detection value.

(19) The input apparatus according to (3),
  wherein the first or second manipulation detection unit detects that the input apparatus main body is gripped by a user with a force equal to or more than a predetermined force,
  wherein the first processing unit detects a magnitude of force with which the input apparatus is gripped, and outputs a gripping force detection value according to the magnitude of the force of gripping, and the first processing unit executes processing for controlling the manipulation target object, based on the gripping force detection value while the detection unit detects that the input apparatus main body is gripped, and wherein, when at least the detection unit detects that the input apparatus main body is gripped, the first response unit gives a first response to the user without relying on control of the first processing unit.

The present disclosure contains subject matter related to that disclosed in Japanese Priority Patent Application JP 2011-161759 filed in the Japan Patent Office on Jul. 25, 2011, the entire content of which is hereby incorporated by reference.

What is claimed is:

1. An input apparatus comprising:
   an input apparatus main body with which input manipulation is performed to manipulate a manipulation target object;
   a first manipulation detection unit that detects a first manipulation on the input apparatus main body;
   a second manipulation detection unit that detects a second manipulation on the input apparatus main body after the first manipulation is detected; and
   a first processing unit that performs first processing for manipulation on the manipulation target object or a first response of the input apparatus, based on a movement detection value corresponding to movement of the input apparatus main body according to the first manipulation or a detection value of the first manipulation,
   wherein after the first manipulation is detected, second processing for manipulation on the manipulation target object or the first response of the input apparatus is performed based on a movement detection value corresponding to movement of the input apparatus main body according to the second manipulation or a detection value of the second manipulation,
   wherein the first manipulation detection unit and the second manipulation detection unit detect that the input apparatus main body is gripped with a pressure equal to or more than a predetermined pressure, and
   wherein the first processing unit includes a first response unit for giving a first response of the input apparatus based on detection of the first manipulation and a first calculation unit for performing calculation for manipulation of the manipulation target object based on the movement detection value corresponding to the movement of the input apparatus main body according to the second manipulation.

2. The input apparatus according to claim 1,
   wherein the first response of the input apparatus given by the first response unit is not transmitted/received to/from a control apparatus controlling the manipulation target object, and the calculation result for manipulation of the manipulation target object provided by the first calculation unit is transmitted/received to/from the control apparatus.

3. The input apparatus according to claim 2,
   wherein the first response processing performed by the first response unit is faster than processing based on the calculation result obtained by the first calculation unit.

4. The input apparatus according to claim 1,
   wherein the first processing and the second processing are different kinds of manipulations.

5. The input apparatus according to claim 1,
   wherein the first processing unit includes a first calculation unit for performing calculation for manipulation of the manipulation target object, based on movement detection in response to the movement of the input apparatus main body according to the first manipulation and a second response unit for giving the second response of the input apparatus based on detection of the second manipulation.

6. The input apparatus according to claim 1,
   wherein the first or second manipulation detection unit detects that the input apparatus main body is gripped by a user with a force equal to or more than the predetermined force,
   wherein the first processing unit detects movement of the input apparatus main body, and outputs a movement detection value according to the movement of the input apparatus main body, and the first processing unit executes processing for controlling the manipulation target object, based on the movement detection value while it is detected that the input apparatus main body is gripped, and
   wherein, when at least the detection unit detects that the input apparatus main body is gripped, the first response unit gives a first response to the user without relying on control of the first processing unit.

7. The input apparatus according to claim 6,
   wherein the input apparatus main body includes
   a base portion having a surface, and
   a shell-shaped portion including a surface and an inner surface facing the surface of the base portion with a gap therebetween and formed to cover the surface of the base portion,
   wherein the input apparatus further includes a switch portion provided between the surface of the base portion and the inner surface of the shell-shaped portion,
   wherein the detection unit is a switch mechanism constituting a portion of the switch portion, and
   wherein the first response unit is a click feeling generating mechanism constituting a portion of the switch portion and generating click feeling as the first response.

8. The input apparatus according to claim 7,
   wherein the detection unit is provided between the surface of the base portion and the switch portion, detects a magnitude of force with which the input apparatus is gripped, and outputs a detection value according to the magnitude of the force of gripping.

9. The input apparatus according to claim 8,
   wherein the input apparatus main body further includes a gripping portion provided to cover a surface of the shell-shaped portion, and is made of a material softer than the base portion and the shell-shaped portion.

10. The input apparatus according to claim 6,
    wherein the first response unit gives the first response to the user when the detection unit detects that the input apparatus is gripped and when the detection unit no longer detects that the input apparatus is gripped.

11. The input apparatus according to claim 6,
    wherein the first processing unit further includes a second response unit giving the user a second response that is different from the first response, according to control of the first processing unit.

12. The input apparatus according to claim 11,
    wherein the detection unit detects a magnitude of the force with which the input apparatus is gripped, and outputs a gripping force detection value according to the magnitude of the force of gripping, and
    wherein the first processing unit controls the second response given by the second response unit, based on the movement detection value or the gripping force detection value.

13. The input apparatus according to claim 6,
wherein the detection unit detects a magnitude of the force with which the input apparatus main body is gripped, and outputs a gripping force detection value according to the magnitude of the force of gripping, and
wherein the first processing unit executes processing for controlling the manipulation target object, based on the movement detection value and the gripping force detection value while it is detected that the input apparatus main body is gripped.

14. The input apparatus according to claim 13,
wherein, when the movement detection value represents a value close to zero, the first processing unit executes processing for continuing movement of the manipulation target object, based on the gripping force detection value.

15. The input apparatus according to claim 1,
wherein the first or second manipulation detection unit detects that the input apparatus main body is gripped by a user with a force equal to or more than a predetermined force,
wherein the first processing unit detects a magnitude of force with which the input apparatus is gripped, and outputs a gripping force detection value according to the magnitude of the force of gripping, and the first processing unit executes processing for controlling the manipulation target object, based on the gripping force detection value while the detection unit detects that the input apparatus main body is gripped, and
wherein, when at least the detection unit detects that the input apparatus main body is gripped, the first response unit gives a first response to the user without relying on control of the first processing unit.

16. The input apparatus according to claim 1, further comprising:
a tri-axial acceleration sensor configured to detect movement of the input apparatus; and
a tri-axial angular velocity sensor configured to detect movement of the input apparatus,
wherein the movement detection value corresponding to movement of the input apparatus main body according to the first manipulation, the detection value of the first manipulation, the movement detection value corresponding to movement of the input apparatus main body according to the second manipulation, and/or the detection value of the second manipulation is based on output information from the tri-axial acceleration sensor and/or the tri-axial angular velocity sensor.

17. The input apparatus according to claim 1, wherein the input apparatus main body further comprises:
a base portion having a surface and a pressure sensor on the surface;
a shell-shaped portion covering the surface of the base portion and having an outer surface;
at least one pressure diffusion plate between the surface of the base portion and the outer surface; and
a gripping portion covering the outer surface of the shell-shaped portion,
wherein the gripping portion, the at least one pressure diffusion plate, and the shell-shaped portion are arranged such that a force applied by a user on the gripping portion is transmitted to the at least one pressure sensor.

18. An input method comprising:
detecting a first manipulation on an input apparatus main body with which input manipulation is performed to manipulate a manipulation target object;
detecting a second manipulation on the input apparatus main body after the first manipulation is detected;
performing first processing for manipulation on the manipulation target object or a first response of the input apparatus, based on a movement detection value corresponding to movement of the input apparatus main body according to the first manipulation or a detection value of the first manipulation;
performing, after the first manipulation is detected, second processing for manipulation on the manipulation target object or the first response of the input apparatus, based on a movement detection value corresponding to movement of the input apparatus main body according to the second manipulation or a detection value of the second manipulation;
detecting that the input apparatus main body is gripped with a pressure equal to or more than a predetermined pressure;
giving a first response of the input apparatus based on detection of the first manipulation; and
performing calculation for manipulation of the manipulation target object based on the movement detection value corresponding to the movement of the input apparatus main body according to the second manipulation.

19. A control system comprising:
an input apparatus which includes
an input apparatus main body with which input manipulation is performed to manipulate a manipulation target object,
a first manipulation detection unit that detects a first manipulation on the input apparatus main body,
a second manipulation detection unit that detects a second manipulation on the input apparatus main body after the first manipulation is detected, and
a first processing unit that performs first processing for manipulation on the manipulation target object or a first response of the input apparatus, based on a movement detection value corresponding to movement of the input apparatus main body according to the first manipulation or a detection value of the first manipulation; and
a control apparatus which controls the manipulation target object according to manipulation of the input apparatus,
wherein, after the first manipulation is detected, the input apparatus performs second processing for manipulation on the manipulation target object or the first response of the input apparatus, based on a movement detection value corresponding to movement of the input apparatus main body according to the second manipulation or a detection value of the second manipulation,
wherein the first manipulation detection unit and the second manipulation detection unit detect that the input apparatus main body is gripped with a pressure equal to or more than a predetermined pressure,
wherein the first processing unit includes a first response unit for giving a first response of the input apparatus based on detection of the first manipulation and a first calculation unit for performing calculation for manipulation of the manipulation target object based on the movement detection value corresponding to the movement of the input apparatus main body according to the second manipulation, and wherein the control apparatus controls the manipulation target object, according to the first processing or the second processing performed by the input apparatus.

* * * * *